(12) United States Patent
Ray Noble et al.

(10) Patent No.: US 8,406,142 B2
(45) Date of Patent: *Mar. 26, 2013

(54) DIAGNOSTICS FOR A SERIAL COMMUNICATIONS DEVICE

(75) Inventors: Gayle Loretta Ray Noble, Boulder Creek, CA (US); Paul Gentieu, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,226

(22) Filed: Apr. 17, 2012

(65) Prior Publication Data

US 2012/0204066 A1 Aug. 9, 2012

Related U.S. Application Data

(63) Continuation of application No. 12/166,238, filed on Jul. 1, 2008, now Pat. No. 8,159,956.

(51) Int. Cl.
*G01R 31/08* (2006.01)

(52) U.S. Cl. ............................ 370/241; 375/228; 714/25

(58) Field of Classification Search .......... 370/241–242, 370/247, 251–252; 375/228; 714/2, 21–22, 714/25, 37, 47–48
See application file for complete search history.

(56) References Cited

U.S. PATENT DOCUMENTS

| | | | |
|---|---|---|---|
| 4,162,531 A | 7/1979 | Rode et al. | |
| 4,273,413 A | 6/1981 | Bendiksen et al. | |
| 4,509,130 A | 4/1985 | Menzies et al. | |
| 4,523,089 A | 6/1985 | Maeda et al. | |
| 4,545,078 A | 10/1985 | Wiedeburg | |
| 4,547,039 A | 10/1985 | Caron et al. | |
| 4,559,616 A | 12/1985 | Bruder | |
| 4,580,044 A | 4/1986 | Hongo et al. | |
| 4,592,057 A | 5/1986 | Comerford | |
| 4,597,631 A | 7/1986 | Flores | |
| 4,612,670 A | 9/1986 | Henderson | |
| 4,612,671 A | 9/1986 | Giles | |
| 4,647,148 A | 3/1987 | Katagiri | |

(Continued)

FOREIGN PATENT DOCUMENTS

| | | |
|---|---|---|
| EP | 0 061 034 B1 | 8/1985 |
| EP | 1168687 A2 | 1/2002 |

(Continued)

OTHER PUBLICATIONS

Acarlar et al., "A High Speed Surface Mount Optical Data Link for Military Applications," IEEE Xplore, 1990, pp. 297-302.

(Continued)

*Primary Examiner* — Kevin Mew
(74) *Attorney, Agent, or Firm* — Morgan, Lewis & Bockius LLP

(57) ABSTRACT

A serial communications device comprises a controller to obtain digital diagnostic data representative of operational characteristics of the serial communications device, memory to store the digital diagnostic data and at least one interface, including an interface to serially communicate data via a serial cable. The serial communications device also comprises a signal controller configured to encode the digital diagnostic data onto a serial data signal for transmission via the serial cable by adjusting signal levels of the serial data signal while preserving original data in the serial data signal. Encoding the digital diagnostic data includes serializing the digital diagnostic data, determining a series of signal levels for the serialized digital diagnostic data based on a signal encoding map, and adjusting signal levels for the serial data signal based on the determined series of signal levels.

22 Claims, 7 Drawing Sheets

U.S. PATENT DOCUMENTS

| | | | |
|---|---|---|---|
| 4,663,760 A | 5/1987 | Shimada et al. |
| 4,685,097 A | 8/1987 | van der Put |
| 4,687,924 A | 8/1987 | Galvin et al. |
| 4,707,067 A | 11/1987 | Haberland et al. |
| 4,734,914 A | 3/1988 | Yoshikawa |
| 4,747,091 A | 5/1988 | Doi |
| 4,809,286 A | 2/1989 | Kollanyi et al. |
| 4,872,080 A | 10/1989 | Hentschel et al. |
| 4,878,225 A | 10/1989 | Aiba et al. |
| 4,890,288 A | 12/1989 | Inuyama et al. |
| 4,903,273 A | 2/1990 | Bathe |
| 4,912,521 A | 3/1990 | Almquist et al. |
| 4,916,707 A | 4/1990 | Rosenkranz |
| 4,918,681 A | 4/1990 | Ikeda |
| 4,932,038 A | 6/1990 | Windus |
| 5,005,939 A | 4/1991 | Arvanitakis et al. |
| 5,019,769 A | 5/1991 | Levinson |
| 5,039,194 A | 8/1991 | Block et al. |
| 5,046,138 A | 9/1991 | Grubb, III |
| 5,047,835 A | 9/1991 | Chang |
| 5,057,932 A | 10/1991 | Lang |
| 5,069,522 A | 12/1991 | Block et al. |
| 5,073,838 A | 12/1991 | Ames |
| 5,117,476 A | 5/1992 | Yingst et al. |
| 5,122,893 A | 6/1992 | Tolbert |
| 5,136,410 A | 8/1992 | Heiling et al. |
| 5,195,154 A | 3/1993 | Uchida |
| 5,199,884 A | 4/1993 | Kaufman et al. |
| 5,202,943 A | 4/1993 | Carden et al. |
| 5,224,866 A | 7/1993 | Nakamura et al. |
| 5,230,638 A | 7/1993 | DiViesti |
| 5,243,678 A | 9/1993 | Schaffer et al. |
| 5,268,949 A | 12/1993 | Watanabe et al. |
| 5,278,404 A | 1/1994 | Yeates |
| 5,334,826 A | 8/1994 | Sato et al. |
| 5,383,208 A | 1/1995 | Queniat et al. |
| 5,392,273 A | 2/1995 | Masaki et al. |
| 5,396,059 A | 3/1995 | Yeates |
| 5,448,629 A | 9/1995 | Bosch et al. |
| 5,479,288 A | 12/1995 | Ishizuka et al. |
| 5,506,922 A | 4/1996 | Grois et al. |
| 5,510,924 A | 4/1996 | Terui et al. |
| 5,515,361 A | 5/1996 | Li et al. |
| 5,515,468 A | 5/1996 | DeAndrea et al. |
| 5,526,160 A | 6/1996 | Watanabe et al. |
| 5,526,164 A | 6/1996 | Link et al. |
| 5,553,237 A | 9/1996 | Eisenberg et al. |
| 5,557,437 A | 9/1996 | Sakai et al. |
| 5,574,435 A | 11/1996 | Mochizuki |
| 5,576,877 A | 11/1996 | Aulet et al. |
| 5,594,748 A | 1/1997 | Jabr |
| 5,596,663 A | 1/1997 | Ishibashi et al. |
| 5,604,757 A | 2/1997 | Liang et al. |
| 5,604,758 A | 2/1997 | AuYeung et al. |
| 5,619,430 A | 4/1997 | Nolan et al. |
| 5,623,355 A | 4/1997 | Olsen |
| 5,659,459 A | 8/1997 | Wakabayashi et al. |
| 5,673,282 A | 9/1997 | Wurst |
| 5,717,533 A | 2/1998 | Poplawski et al. |
| 5,734,558 A | 3/1998 | Poplawski et al. |
| 5,734,672 A | 3/1998 | McMinn et al. |
| 5,745,409 A | 4/1998 | Wong et al. |
| 5,748,672 A | 5/1998 | Smith et al. |
| 5,761,216 A | 6/1998 | Sotome et al. |
| 5,801,866 A | 9/1998 | Chan et al. |
| 5,812,572 A | 9/1998 | King et al. |
| 5,822,099 A | 10/1998 | Takamatsu |
| 5,844,928 A | 12/1998 | Shastri et al. |
| 5,854,704 A | 12/1998 | Grandpierre |
| 5,887,254 A | 3/1999 | Halonen |
| 5,926,303 A | 7/1999 | Giebel et al. |
| 5,943,152 A | 8/1999 | Mizrahi et al. |
| 5,953,690 A | 9/1999 | Lemon et al. |
| 5,956,168 A | 9/1999 | Levinson et al. |
| 5,987,628 A | 11/1999 | Von Bokern et al. |
| 5,999,549 A | 12/1999 | Freitag et al. |
| 6,010,538 A | 1/2000 | Sun et al. |
| 6,014,241 A | 1/2000 | Winter et al. |
| 6,020,593 A | 2/2000 | Chow et al. |
| 6,021,947 A | 2/2000 | Swartz |
| 6,023,147 A | 2/2000 | Cargin, Jr. et al. |
| 6,049,413 A | 4/2000 | Taylor et al. |
| 6,064,501 A | 5/2000 | Roberts et al. |
| 6,097,746 A | 8/2000 | Noda et al. |
| 6,108,114 A | 8/2000 | Gilliland et al. |
| 6,115,113 A | 9/2000 | Flockencier |
| H1881 H | 10/2000 | Davis et al. |
| RE36,886 E | 10/2000 | Ishibashi et al. |
| 6,160,647 A | 12/2000 | Gilliland et al. |
| 6,175,434 B1 | 1/2001 | Feng |
| 6,205,505 B1 | 3/2001 | Jau et al. |
| 6,222,660 B1 | 4/2001 | Traa |
| 6,256,127 B1 | 7/2001 | Taylor |
| 6,317,804 B1 | 11/2001 | Levy et al. |
| 6,359,938 B1 | 3/2002 | Keevill et al. |
| 6,423,963 B1 | 7/2002 | Wu |
| 6,469,906 B1 | 10/2002 | Baltz et al. |
| 6,473,224 B2 | 10/2002 | Dugan et al. |
| 6,512,617 B1 | 1/2003 | Tanji et al. |
| 6,526,076 B2 | 2/2003 | Cham et al. |
| 6,539,036 B2 | 3/2003 | Lehr et al. |
| 6,580,531 B1 | 6/2003 | Swanson et al. |
| 6,631,146 B2 | 10/2003 | Pontis et al. |
| 6,661,836 B1 | 12/2003 | Dalal et al. |
| 6,694,462 B1 | 2/2004 | Reiss et al. |
| 6,711,189 B1 | 3/2004 | Gilliland et al. |
| 6,748,181 B2 | 6/2004 | Miki et al. |
| 6,774,942 B1 | 8/2004 | Salcedo et al. |
| 6,802,654 B1 | 10/2004 | Roberts et al. |
| 6,850,398 B2 | 2/2005 | Ciancio |
| 6,862,302 B2 | 3/2005 | Chieng et al. |
| 6,891,866 B2 | 5/2005 | Robinson et al. |
| 6,937,949 B1 | 8/2005 | Fishman et al. |
| 6,941,077 B2 | 9/2005 | Aronson et al. |
| 6,952,531 B2 | 10/2005 | Aronson et al. |
| 6,957,021 B2 | 10/2005 | Aronson et al. |
| 7,050,720 B2 | 5/2006 | Aronson et al. |
| 7,058,310 B2 | 6/2006 | Aronson et al. |
| 7,079,775 B2 | 7/2006 | Aronson et al. |
| 7,130,539 B2 | 10/2006 | Shahar et al. |
| 7,162,160 B2 | 1/2007 | Aronson et al. |
| 7,184,668 B2 | 2/2007 | Aronson et al. |
| 7,233,027 B2 | 6/2007 | Neumeuer et al. |
| 7,255,490 B2 | 8/2007 | Zhang et al. |
| RE40,150 E | 3/2008 | Ishibashi et al. |
| RE40,154 E | 3/2008 | Ishibashi et al. |
| 7,474,630 B2 * | 1/2009 | Huang et al. ................. 370/254 |
| 7,507,037 B2 | 3/2009 | Yang et al. |
| 7,574,540 B2 | 8/2009 | Robillard et al. |
| 7,574,630 B1 | 8/2009 | Ranaweera et al. |
| 7,653,840 B1 | 1/2010 | Taylor et al. |
| 7,801,120 B2 * | 9/2010 | Steinmetz et al. ............ 370/360 |
| 7,843,846 B1 * | 11/2010 | Dropps et al. ................ 370/252 |
| 8,159,956 B2 * | 4/2012 | Ray Noble et al. .......... 370/241 |
| 2002/0021468 A1 | 2/2002 | Kato et al. |
| 2002/0027688 A1 | 3/2002 | Stephenson |
| 2002/0060824 A1 | 5/2002 | Liou et al. |
| 2002/0097468 A1 | 7/2002 | Mecherle et al. |
| 2002/0101641 A1 | 8/2002 | Kurchuk |
| 2002/0105982 A1 | 8/2002 | Chin et al. |
| 2002/0149821 A1 | 10/2002 | Aronson et al. |
| 2002/0181519 A1 | 12/2002 | Vilhelmsson et al. |
| 2002/0181894 A1 | 12/2002 | Gilliland et al. |
| 2003/0053170 A1 | 3/2003 | Levinson et al. |
| 2003/0113118 A1 | 6/2003 | Bartur |
| 2003/0210917 A1 | 11/2003 | Stewart et al. |
| 2004/0076113 A1 | 4/2004 | Aronson et al. |
| 2004/0120720 A1 | 6/2004 | Chang et al. |
| 2004/0122607 A1 | 6/2004 | Fishman et al. |
| 2004/0153913 A1 | 8/2004 | Fishman et al. |
| 2004/0202210 A1 | 10/2004 | Thornton |
| 2004/0240886 A1 | 12/2004 | Aronson et al. |
| 2004/0253003 A1 | 12/2004 | Farmer et al. |
| 2005/0031352 A1 | 2/2005 | Light et al. |
| 2005/0058455 A1 | 3/2005 | Aronson et al. |
| 2005/0246568 A1 * | 11/2005 | Davies ............................ 714/2 |
| 2006/0251087 A1 | 11/2006 | Ng et al. |

| | | | |
|---|---|---|---|
| 2007/0189174 A1 | | 8/2007 | Hibbert |
| 2007/0189175 A1* | | 8/2007 | Vedanabhatla et al. ....... 370/241 |
| 2007/0189176 A1 | | 8/2007 | Milne et al. |
| 2008/0187033 A1* | | 8/2008 | Smith .......................... 375/228 |
| 2008/0189641 A1* | | 8/2008 | Kotturu et al. ................. 715/771 |
| 2008/0253293 A1* | 10/2008 | | Beyers ......................... 370/242 |
| 2011/0161728 A1* | | 6/2011 | Kano et al. .................... 714/6.21 |

FOREIGN PATENT DOCUMENTS

| | | |
|---|---|---|
| EP | 1471671 A2 | 10/2004 |
| JP | 58-140175 A | 8/1983 |
| JP | 62-124576 A | 6/1987 |
| JP | 62-235975 A | 10/1987 |
| JP | 62-281485 A | 12/1987 |
| JP | 2-102589 A | 4/1990 |
| JP | 4-023373 A | 1/1992 |
| JP | 06-097548 | 4/1994 |
| JP | 6-504405 T | 5/1994 |
| JP | 6-209209 A | 7/1994 |
| JP | 9-162811 A | 6/1997 |
| JP | 2002-191821 | 7/2002 |
| JP | 2004-057292 | 2/2004 |
| WO | WO 93/21706 A1 | 10/1993 |
| WO | WO 98/00893 A1 | 1/1998 |
| WO | WO 98/00943 A1 | 1/1998 |
| WO | WO 02/063800 A1 | 8/2002 |
| WO | WO 2004/013991 A | 2/2004 |
| WO | WO 2004/098100 A2 | 11/2004 |

OTHER PUBLICATIONS

ADC Fiber Optic Transceiver Evaluation Kit Advertisement, International Fiber Optics and Communications, Sep. 1986, 1 pg.

Andary et al., "The Development Test Flight of the Flight Telerobotic Servicer: Design Description and Lessons Learned," IEEE Transactions on Robotics and Automation, vol. 9, No. 5, Oct. 1993, pp. 664-674.

Annex 48B (Jitter Test Methods) Analog Target Specification, IEEE, May 2001, pp. 6-14.

Atmel, IR Receiver ASSP T2525, Product Information, Rev. 4657C-Auto, Oct. 2003, 10 pgs.

Avella, AN/ARC-144 UHF Multimode Transceiver, Sep. 1971, pp. 14-15.

Baldwin et al., "Fiber Optic Module Interface Attachment," Research Disclosure, Oct. 1991, No. 330, Kenneth Mason Publications Ltd, England, 1 pg.

Baumgartner et al., "An Integrated 1.25 Gbit/s Laser Driver/ Post Amplifer IC," IEEE Custom Integrated Circuits Conference, IBM-AS/400 Division, 1997, pp. 17-20.

Cai et al., "Jitter Testing for Gigabit Serial Communication Transceivers," Design & Test of Computers, IEEE, vol. 19, Issue 1, Jan.-Feb. 2002, pp. 66-74.

CFR 1040.10, "Code of Federal Regulations," Title 21, vol. 8, Apr. 1, 2009, 23 pgs.

Chown et al., "Integrated Transceiver for FDDI," IEEE Xplore, May 1989, pp. 378-383.

Clark, "The PCB Connector as a Surface Mounted Device," IEEE Transactions on Components, Hybrids, and Manufacturing Technology, vol. CHMT-8, No. 4, Dec. 1985, pp. 530-534.

Dallas Semiconductor Maxim, DS1847 "Dual Temperature-Controlled NV Variable Resistor," Jan. 18, 2006, pp. 1-17.

Dallas Semiconductor Maxim, DS1848 "Dual Temperature-Controlled NV Variable Resistor and Memory," Jan. 18 2006, pp. 1-17.

Einwaechter, "Shortwave Transmitter & Receiver System FuG 101 for Telegraphy and Telephony," Siemens Review LIII, 1976, pp. 526-529.

European Search Report for 02704344.7 dated Oct. 5, 2004, 4 pgs.

European Search Report for 04777655.4 dated Jan. 24, 2008, 5 pgs.

Fairchild Semiconductor, "CMOS, the Ideal Logic Family," Application Note 77, Jan. 1983, 10 pgs.

Fairhurst, "Manchester Encoding", Jan. 9, 2001, 2 pgs., http://www.erg.abdn.ac.uk/user/gorry/course/phy-pages/man.html.

Finisar Corp., App Note AN-2025: Using the Finisar GBIC I2C Test Diagnostics Port, 1998, 16 pgs.

*Finisar Corporation* v. *Source Photonics*, Civil Case No. CV 10-00032 WHA, Defendant and Counterclaimant Source Photonics Inc.'s Preliminary Invalidity Contentions Pursuant to Patent L.R.3-3, Jul. 9, 2010, 39 pgs.

Hanson, D., "Wiring with Plastic: A Growing Interest in High-Speed, Short Distance Communications Links is Opening a Huge Market for Plastic Optical Fibers," IEEE LTS, Feb. 1992, pp. 34-39.

Hartman, D., "Optical Interconnection Technology in the Telecommunications Network," IEEE, 1986, pp. 464-478.

Hausdorf, "Mobile Transceiver Measurements with Radiocommunication Service Monitor CMS", 1989, pp. 4-7.

Heuler, R., "Thesis: Design, Implementation and Test of an RS-232 Compatible Bi-Directional, Full Duplex, Fiber-Optic Interface with Provision for Hardware Handshaking on a Minimum of Fiber-Optic Lines," Naval Postgraduate School, Monterey, California, Jun. 1989, 129 pgs.

Hewlett Packard HFBR-5203/-5203T, 800 nm 300 m HFBR 5204/-5204T 1300 nm 500 m HFBR-5205/-5205T 1300 nm 2 km, "ATM Multimode Fiber Transceivers for SONET OC-3/SDH STM-1 in Low Cost 1×9 Package Style," May 1997, pp. 107-125.

Hewlett Packard HFBR-5301-HFBR-5302, "Fibre Channel 133 MBd and 266 MBd Transceivers in Low Cost 1×9 Package Style," Mar. 1995, pp. 215-226.

Hewlett Parckard HFBR-5103/-5103T, 1300 nm 2000 m HFBR 5104/-5104T 800 nm 500 m HRBR-5105/-5105T 1300 nm 500 m, "FDDT, 100 MBPS ATM and Fast Ethernet Transceivers in Low Cost 1×9 Package Style," May 1997, pp. 126-147.

I2C, Webopedia.com, Mar. 12, 2002, 1 pg., http://www.webonedia.com/TERM/I/12C.html.

ILX Lightwave Corporation, LDC3722 Laser Diode Controller, Instruction Manual, May 25, 1990, Chapter 2 ,5 & 6.

Infineon Technologies, "OptiPort™ SFF BIDI®-Transceiver 100 Mbit/s, 1310 nm Tx/1550 nm Rx", V23870-A 1133-Kx01, Data Sheet, Jun. 22, 2004, 1 pg.

International Search Report for PCT/US02/03226 dated May 9, 2002, 3 pgs.

International Search Report for PCT/US04/11130 dated Oct. 12, 2004, 3 pgs.

Jackson, K., "Low-Cost Compact, Gigabit Transceivers for Data Communications," IEEE Electronic Components and Technology Conference, 1997, pp. 1-6.

Johnson, B., "Single Chip Transceivers Help Facilitate Fibre-Channel Implementation," May 1999, Computer Technology Review vol. XIX, No. 5, 2 pgs.

MAC address, Webopedia.com, ), Aug. 8, 2002, 2 pg., http://www.webopedia.com/TERM/M/MAC_address.html.

Maeda, Notification of Reasons for Refusal, JP Patent Application 2002-563630, Nakamura, M, Jul. 13, 2005, 10 pgs.

Maxim Engineering Journal, "Optical/Electrical Conversion in SDH/SONET Fiber Optic Systems," Special Fiber Optic Edition, 1999, 15 pgs.

Maxim Integrated Products, "622Mbps LAN/WAN Laser Driver with Automatic Power Control and Safety Shutdown," MAX3766, 1997, pp. 1-19.

Mendez, A Circuit to Provide Protection from Surge Voltages (for CB Transceiver), May 1984, 5 pgs.

Nagahori et al., "150 Mbits$^{-1}$ ch$^{-1}$ 12-channel Optical Parallel Interface Using an LED and a PD Array," Optical and Quantum Electronics 24, 1992, pp. S479-S490.

National Semiconductor, DS92LV16 Design Guide, Feb. 2002, 20 pgs.

National Semiconductors, "LM75 Digital Temperature Sensor and Thermal Watchdog with Two-Wire Interface," 1997, 5 pgs.

National Semiconductors, "LM78 Microprocessor System Hardware Monitor," Feb. 2000, pp. 1-31.

PCO FDDI Transceiver, "FTR-1300-S1 FDD1 Data-Only Transceiver," Jun. 11, 1990, 8 pgs.

PCO FDDI Transceiver, "FTR-1300-S1N and FTR-1300-S1C FDDI Data-Only Transceivers Preliminary Sheets," Jan. 31, 1991, 8 pgs.

Phillips Semiconductors, "NE1619 HECETA4 Temperature and Voltage Monitor," Jul. 13, 2000, 18 pgs.

Phillips Semiconductors, "NE1617 Temperature Monitor for Microprocessor Systems," Mar. 19, 1999, 16 pgs.

Public-Key Encryption, Oct. 9, 2003, 1 pg., http://www.webopedia.com/term/p/public_key_cryptography.html.
Purdy Electronics Corporation, OPTO-3001A Transceiver OPTO-3001 Transceiver, Digital Digital Data Links (660 & 800 nm), Interoptics, Jun. 5, 2000, 1 pg.
SFF Committee, SFF-8053 Specification for GBIC (Gigabit Interface Converter), Rev 5.5, Sep. 27, 2000, pp. i-xviii and 1-66.
Soderstrom, et al., "CD Laser Optical Data Links for Workstations and Midrange Computers," IEEE Xplore, 1993, pp. 505-509.
Synchronous Optical Network (SONET) Transport Systems: Common Generic Criteria GR-253-CORE, Issue 2, Dec. 1995, Revision 2, Jan. 1999, 785 pgs.
Texas Instruments, TLK1501 Serdes EVM Kit Setup and Usage, User's Guide, SLLU008, Jun. 2000, 53 pgs.
Texas Instruments, TLK2201 Serdes EVM Kit Setup and Usage, User's Guide, SLLU011, Jun. 2000, 26 pgs.
The 7 Layers of the OSI Model, Webopedia, Aug. 8, 2002, 3 pgs. http://webopedia.internet.com/quick_ref/OSI-Layers.asp.
THMC10 Remote/Local Temperature Monitor with SMBus Interface, Texas Instruments, Dec. 1999, 22 pgs.
Toshiba, "Fiber Optic Transceiver Module TODX280A," Fiber Optic Transceiving Module for Duplex Digital Signal Communication, Jul. 26, 2001 9 pgs.
Toshiba, "Fiber Optic Transceiver Module TODX294," Fiber Optic Transceiving Module for Duplex Digital Signal Communication, Aug. 31, 2001, 9 pgs.
Uda et al., "Fiber Optic Transciever for FDDI Application," FOC/LAN 1988, pp. 160-164.
Vaishali Semiconductor, Fibre Channel Transceiver VN16117, preliminary Product Information, MDSN-0002-02, Aug. 9, 2001, 15 pgs.
Xicor, Hot Pluggable X9520, "Fiber Channel / Gigabit Ethernet Laser Diode Control for Fiber Optic Modules," Jan. 18, 2001, 33 pgs.
Yamashita et al., "Compact-Same-Size 52-and 156 Mb/s SDH Optical Transceiver Modules," Journal of Lightwave Technology, vol. 12, No. 9, Sep. 1994, pp. 1607-1615.
Amp, "One-Piece Printed Circuit Board Connectors," Interconnection Systems Selection Guide 82750, Jul. 1995, 3 pgs.
Atmel, "IR Receiver for Data Communication U2538B," Product Information, Rev. 4717A-IRRC, May 2003, 9 pgs.
Atmel, "Low-Voltage Highly Selective IR Receiver IC, T2527," Rev. 4600B-IRDC, Dec. 2002, 11 pgs.
Atmel, "Selection Guide Infrared Receiver ICs T2525/T2526/T2527 for Use in IR Receiver Module Applications," Application Note, Rev. 4672A, Feb. 2003, 11 pgs.
Coombs, "Printed Circuits Handbook," Fourth Edition, 1996, 4 pgs.
Definition of "Interface", Microsoft Press Computer Dictionary Second Edition, 1994, 8 pgs.
Definition of "Interface," Newton's Telecom Dictionary, Eleventh Edition, 1996, 3 pgs.
Definition of "Interface", Webster's Desk Dictionary, 1995, 3 pgs.
Definition of "Location", McGraw-Hill Electronics Dictionary, Fifth Edition, 1994, 3 pgs.
Definition of "Motherboard", Fiber Optics Standard Dictionary Third Edition, 1997, 5 pgs.
Definition of "Motherboard", Teee 100, The Authoritative Dictionary of IEEE Standards Terms, Seventh Edition, 2000, 6 pgs.
Definition of "Mount", The American Heritage Dictionary of the English Language, Third Edition, 1996, 3 pgs.
Definition of "Surface Mount Technology," McGraw-Hill Electronics Dictionary, Fifth Edition, 1994, 9 pgs.
DLX2000 Transceiver, Fiber Optic Data Link, BT&D Technologies, May 1989, 5 pgs.
Fiber Optics Standard Dictionary, Third Edition, 1997, two cover pages and p. 540.
*Finisar Corporation* v. *Source Photonics, Inc.* Case No. CV-10-00032-WHA [Proposed] Claim Construction Order of Finisar Corporation, Document 70, Aug. 25, 2010, 3 pgs.
*Finisar Corporation* v. *Source Photonics, Inc.* Case No. CV-10-00032 WHA, Declaration of Dr. Joseph M. Kahn in Support of Finisar's Opening Claim Construction Brief, Document 68, Aug. 25, 2010, 9 pgs.

*Finisar Corporation* v. *Source Photonics, Inc.* Case No. CV-10-00032 WHA, Declaration of Paul K. Wright in Support of Source Photonics, Inc.'s Responsive Claim Construction Brief, Document 73, Sep. 8, 2010, 8 pgs.
*Finisar Corporation* v. *Source Photonics, Inc.* Case No. CV-10-00032 WHA, Defendant and Counterclaimant's Responsive Claim Construction Brief, Document 72, Sep. 8, 2010, 29 pgs.
*Finisar Corporation* v. *Source Photonics, Inc.* Case No. CV-10-00032 WHA, Finisar's Opening Claim Construction Brief Pursuant to Patent L.R. 4-5, Document 67, Aug. 25, 2010, 30 pgs.
*Finisar Corporation* v. *Source Photonics, Inc.* Case No. CV-10-00032 WHA Joint Claim Construction and Prehearing Statement Pursuant to Patent L.R. 4-3, Document 65, Aug. 13, 2010, 57 pgs.
IEEE 100, The Authoritative Dictionary of IEEE Standards Terms, 2000, two cover pages and pp. 684-685.
Intel "LXT16706/16707 SerDes Chipset," Product Information, 2002, 2 pgs.
Intel "LXT35401XAUI-to-Quad 3.2G Transceiver," Product Information, Apr. 4, 2002, 2 pgs.
Microsoft Press Computer Dictionary, Second Edition, 1994, two cover pages and p. 261.
Newton's Telecom Dictionary, Eleventh Edition, 1996, two cover pages and pp. 388 and 575.
Petition to Make Special Under 37 C.F.R. §1.102, U.S. Appl. No. 09/777,917, Dec. 11, 2002, 12 pgs.
Petition to Make Special Under 37 C.F.R. §1.102, U.S. Appl. No. 10/266,869, Oct. 27, 2003, 9 pgs.
Response to Final Office Action, U.S. Appl. No. 10/657,554, Sep. 16, 2005, 12 pgs.
Response to Office Action, U.S. Appl. No. 11/077,280, May 22, 2006, 8 pgs.
Response to Office Action, U.S. Appl. No. 10/266,869, Jan. 31, 2005, 22 pgs.
Response to Office Action, U.S. Appl. No. 10/657,554, Mar. 13, 2006, 15 pgs.
Response to Office Action, U.S. Appl. No. 10/657,554, Jan. 31, 2005, 9 pgs.
Response to Office Action, U.S. Appl. No. 10/713,685, Nov. 23, 2004, 17 pgs.
Response to Office Action, U.S. Appl. No. 10/713,752, Nov. 19, 2004, 10 pgs.
Response, U.S. Appl. No. 10/766,488, Feb. 27, 2007, 51 pgs.
Secondary Preliminary Amendment, U.S. Appl. No. 10/266,869, Oct. 27, 2003, 12 pgs.
TRV5366 OC-1, Transceiver, Oct. 1993, 2 pgs.
TRV5466 OC-3 Transceiver, Oct. 1993, 2 pgs.
Wright. "21st Century Manufacturing," First Edition, 2001, p. 234.
Aronson, L., Digital Diagnostic Monitoring Interface for Optical Transceivers, Draft Rev. 9.0, 31 pgs, Mar. 28, 2002.
Course Schedule, Fibre Channel Group, 4 pgs, Nov. 23, 1998.
Finisar, Analyzers, Fibre Channel, GLA-2000 Gigabit Link Analyzer, 1 pg, Feb. 5, 1998.
Finisar, Application Note AN-2010: Using the Built-in Test/Diagnostics Port on FTR-XX10 Transceivers, FTM-XX10 Transmitters and FRM-XX10 Receivers, 14 pages, May 19, 1997.
Finisar, Fibre Channel Gigabit Traffic (GT) System Provides Performance and Protocol Analysis, Data Generation and BER Testing in Portable or Desktop Configurations, 4 pgs, Jan. 21, 1998.
Finisar, Finisar Introduces "Smart GBICs", 3 pgs, Jul. 8, 1998.
Finisar, GBIC Transceivers, Fibre Channel, Gigabit Ethernet, Up to 1.25 Gb/s, 4 pgs, Sep. 11, 1999.
Finisar, Gigabit Transceivers Simplify LAN Connection; Give Network Hardware Designers Choice of Coax, Multi-Mode and Single-Mode Fiber Optic Transmission, 3 pgs, Aug. 15, 1995.
Finisar, Handheld Link Status and Performance Monitor for Fibre Channel or Gigabit Ethernet From Finisar Corporation, 2 pgs, Jul. 13, 1998.
Finisar, Link Extenders, FLX-2000, Powerful Built-In Diagnostics, 1 pg, Feb. 5, 1998.
Finisar, Link Extenders, FLX-2000, Versatile Monitoring Capabilities, 1 pg, Feb. 5, 1998.

Finisar, Low-Cost Analyzer Tests Several High-Speed Gigabit Links; Provides "Parallel Bit Error Rate" and Multifunction Testing, 3 pgs, Jul. 15, 1993.
Finisar, Optic Modules, Application Note AN-2010, Communication During Open Fiber Control Protocol Sequence, 2 pgs, Feb. 5, 1998.
Finisar, Optic Modules, Application Note AN-2010, Introduction, 2 pgs, Feb. 5, 1998.
Finisar, Optic Modules, Application Note AN-2010, Network Communication with Multiple Modules, 4 pgs, Feb. 5, 1998.
Finisar, Optic Modules, Application Note AN-2010, Simplex Link Operation, 1 pg, Feb. 5, 1998.
Finisar, Optic Modules, Application Note AN-2010, Table I: FTR-XX10/FTM-XX10 Data Request Command List, 2 pgs, Feb. 5, 1998.
Finisar, Optic Modules, Application Note AN-2010, Table II: FTR-XX10/FTM-XX10 System Command List, 1 pg, Feb. 5, 1998.
Finisar, Optic Modules, FTM-8510 Transmitter/FRM-8510 Receiver, FTM/FRIVI-8510 Low Cost, Gigabit Fiber Optic Transmitter/Receiver, 1 pg, Feb. 5, 1998.
Finisar, Optic Modules, FTR-8510 Transceiver, FTR-8510 Low Cost, Gigabit Fiber Optic Transceiver, 1 pg, Feb. 5, 1998.
Finisar, Optical Link Extender from Finisar Corporation Lengthens Fibre Channel Connections More Than Fifteen Fold, 2 pgs, Apr. 2, 1996.
Franklin, A Hard Look at SANs, Finisar's SAN QoS reveals Fibre Channel secrets, 3 pgs, Sep. 17, 2001.
Hewlett Packard, ATM Multimode Fiber Transceivers for SONET OC-3/SDH STM-1 in Low Cost 1×9 Package Style, 19 pgs, May 1997.
Hewlett Packard, FDDI, 100 Mbps ATM, and Fast Ethernet Transceivers in Low Cost 1×9 Package Style, 22 pgs, May 1997.
ILX Lightwave Corporation, LDC3722 Laser Diode Controller, Instruction Manual, Chapters 1, 2, 3 & 4, 234 pgs, May 25, 1990.
Maxim, 622Mbps LAN/WAN Laser Driver with Automatic Power Control and Safety Shutdown, MAX3766, pp. 1-19, Nov. 2004.
Maxim, High-Efficiency, Current-Mode, Inverting PWM Controller, MAX 1846/MAX1847, 20 pgs, Aug. 2001.
National Semiconductor, LM75 Digital Temperature Sensor and Thermal Watchdog with Two-Wire Interface, 17 pgs, Apr. 2000.
National Semiconductor's Temperature Sensor Handbook, 40 pgs, Jan. 1, 1998.
OCP 1×9 Duplex SC Package with EMI Shield Package Outline, 3 pgs, Jul. 27, 2000.
OCP 1×9 Package with ST & FC connector, Package Outline, 1 pg, May 15, 2000.
OCT DTC-01, OC-1 Single Mode Transceiver with Clock Recovery, 5 pgs, Sep. 10, 1999.
OCP DTC-03, OC-3/STM-1 Single Mode Transceiver with Clock Recovery, 5 pgs, Aug. 30, 1999.
OCP DTC-03-3.3, 3.3 volt OC-3/STM-1 Single Mode Transceiver with Clock Recovery, 5 pgs, Mar. 30, 1999.
OCP DTC-03-3.3-A-L0-LR1-N, OC-03/STM-1 Single Mode Transceiver, 1 pg. Mar. 15, 2002.
OCP DTC-03-3.3-S, 3.3 volt OC-3/STM-1 Single Mode Transceiver with Clock Recovery, 5 pgs, Mar. 15, 1999.
OCP DTC-03-A-L0-LR1-N, OC-03/STM-1 Single Mode Transceiver, 1 pg, Mar. 15, 2002.
OCP DTC-03-H, OC-3/STM-1 Single Mode Transceiver with Clock Recovery with PECL Signal Dectect Output, 5 pgs, Mar. 25, 1999.
OCP DTC-03-MM, OC-3/STM-1 Multimode Transceivver with Clock Recovery & TTL Signal Detect Output, 5 pgs, Oct. 26, 1998.
OCP DTC-03-MM-H, OC-3/STM-1 Multimode Transceiver with Clock Recovery & PECL Signal Detect Output, 5 pgs, Mar. 1, 1999.
OCP DTC-12 GF2, OC-12/STM-4 "GF2" Single Mode Transceiver with Clock Recovery, 4 pgs, Dec. 17, 1999.
OCP DTC-12, OC-12/STM-4 Single Mode Transceiver with Clock Recovery, 5 pgs, Nov. 30, 1998.
OCP DTC-12-3.3, 3.3 volt OC-12/STM-4 Single Mode Transceiver with Clock Recovery, 5 pgs, Sep. 16, 2002.
OCP DTC-12-3.3, 3.3 volt OC-12/STM-4 Single Mode Transceiver with Clock Recovery, 5 pgs, Mar. 22, 1999.
OCP DTC-12-3.3-S, 3.3 volt OC-12/STM-4 Single Mode Transceiver with Clock Recovery, 5 pgs, Oct. 15, 1999.
OCP DTC-12-H, OC-12/STM-4 Single Mode Transceiver with Clock Recovery, 5 pgs, Nov. 30, 1998.
OCP DTC-12-MM, OC-12/STM-4 Multimode Transceiver with Clock Recovery, 5 pgs, Dec. 15, 1998.
OCP DTC-12-MM-T-GF2 (T is A or B temperature option), OC-12/STM-4 "GF2" Multimode Transceiver with Clock Recovery, 4 pgs, May 26, 1999.
OCP DTC-12-S, OC-12/STM-4 Single Mode Transceiver with Clock Recovery & Differential Facet Monitors, 5 pgs, Apr. 20, 1998.
OCP DTC-48, OC-48/STM-16 Single Mode Transceiver with Clock Recovery, 5 pgs, Apr. 30, 1999.
OCP DTC-48-H, OC-48/STM-16 Single Mode Transceiver with Clock Recovery, 5 pgs, Oct. 11, 2000.
OCP DTL-125 & DTL-200, Hermetically Sealed Data Link Modules, 5 pgs, Feb. 5, 2002.
OCP DTL-125 & DTL-200W, Wide Temperature Range Hermetic Data Link Modules, 5 pgs, Oct. 15, 2001.
OCP DTL-1300-F & DTL-1300-S, High Performance Hermetically Sealed Data Link Modules, 5 pgs, Feb. 5, 2002.
OCP DTL-200-RX-SW-100, Short Wavelength Hermetic Receiver, 2 pgs, Dec. 10, 1997.
OCP DTL-270, Hermetically Sealed Data Link Modules at 270 Mb/s, 5 pgs, Feb. 5, 2002.
OCP DTR Multimode Transceivers, for ATM/SONET/SDH, Fibre Channel, FDDI & Fast Ethernet, 9 pgs, Sep. 28, 1999.
OCP DTR-1062-3.3-MM, 3.3 V 1×9 1.062 Gbaud Fibre Channel Shortwave Transceivers, 5 pgs, Nov. 6, 1998.
OCP DTR-1062-MM, 1×9 1.062 Gbaud Fibre Channel Shortwave Transceivers, 5 pgs, Nov. 5, 1998.
OCP DTR-1062-MM-GB & DTR-1062-3.3-MM-GB, GBIC Interface Fibre Channel 850 nm VCSEL Transceivers, 5 pgs, Oct. 19, 1998.
OCP DTR-1062-SM, 1.062 Gbaud Fibre Channel Longwave Transceiver, 5 pgs, Sep. 15, 1998.
OCP DTR-1062-SM-GB, GBIC Interface Fibre Channel Long wave Laser Transceivers, 5 pgs, Jan. 25, 1999.
OCP DTR-1250-3.3-MM-T, 3.3 V 1×9 Gigabit Ethernet 850 nm VCSEL Transceivers with TTL Signal Detect output, 8 pgs, Sep. 4, 2002.
OCP DTR-1250-3.3-SM, 3.3 V 1×9 Gigabit Ethernet 1300 & 1550 nm Laser Transceivers, 5 pgs, Dec. 20, 2001.
OCP DTR-1250-MM, 1×9 Gigabit Ethernet 850 nm VCSEL Transceivers, 5 pgs, Sep. 23, 1998.
OCP DTR-1250-MM-GB & DTR-1250-3.3-MM-GB, GBIC Interface Gigabit Ethernet 850 nm VCSEL Transceivers, 5 pgs, Oct. 19, 1998.
OCP DTR-1250-MM-LC-MR & DTR-1250-MM-LS-MR, 3.3V LC connector SFF Multi-Rate Gigabit Ethernet 850 nm VCSEL Transceivers, 6 pgs, May 28, 2002.
OCP DTR-1250-MM-LS-C-AC-M-S1-ALC, 3.3V LC connector SF Gigabit Ethernet 850 nm Laser Transceivers, 1 pg, Sep. 27, 2002.
OCP DTR-1250-MM-MR, 1×9 Gigabit Ethernet 850 nm VCSEL Multirate Transceivers, 5 pgs, May 14, 2002.
OCP DTR-1250-SM, 1×9 Gigabit Ethernet 1300 nm & 1550 nm Laser Transceivers, 5 pgs, Dec. 1, 1998.
OCP DTR-1250-SM2-LC/LS-HS-CWDM, 3.3V LC connector SFF Gigabit Ethernet CWDM Laser Transceivers Employing an Avalanche Photodiode (APD) Receiver, 7 pgs, Nov. 14, 2002.
OCP DTR-1250-SM-CWDM, 1×9 Gigabit Ethernet CWDM Laser Transceivers, 5 pgs, Jan. 18, 2002.
OCP DTR-1250-SM-GB, GBIC Interface Gigabit Ethernet 1300 & 1550 nm Laser Transceivers, 5 pgs, May 14, 1999.
OCP DTR-1250-SM-GB-CWDM, GBIC Interface Gigabit Ethernet CWDM Laser Transceivers, 5 pgs, Jan. 9, 2002.
OCP DTR-1250-SM-LC/LS-CWDM, 3.3V LC connector SFF Gigabit Ethernet CWDM Laser Transceivers, 5 pgs, Jan. 28, 2002.
OCP DTR-1250-SM-LC/LS-MR, 3.3V LC connector SFF Gigabit Ethernet 1300 nm & 1550 nm Multirate Laser Transceivers, 6 pgs, May 16, 2002.
OCP DTR-1250-SM-LS-A-H3-AC-M-S1-ALC, 3.3V LC connector SFF Gigabit Ethernet 1310 nm Laser Transceivers, 1 pg, Sep. 27, 2002.

OCP DTR-1250-SM-LS-A-H7-AC-M-S1-ALC, 3.3V LC connector SFF Gigabit Ethernet 1550 nm Laser Transceivers, 2 pgs, Sep. 27, 2002.
OCP DTR-156-3.3-SM2-A-L0-LR1-N, 3.3V 2×9 SC connector OC-03/STM-1 Single Mode Transceiver, 1 pg, Nov. 2, 2001.
OCP DTR-156-3.3-SM2-B-HP-1510, 5.0 Volt 2×9 OC-3 1510nm DFB Single Mode Transceivers, 1 pg, Jul. 4, 2001.
OCP DTR-156-3.3-SC-A-L0-LR1-N, 3.3V 1×9 SC Connector OC-3/STM-1 Single Mode Transceiver, 1 pg, Feb. 1, 2002.
OCP DTR-156-3.3-SM-A-LR2-W, 3.3 Volt Single Mode Transceivers (1×9 pin-out), 1 pg, Jan. 17, 2001.
OCP DTR-156-LS-A-ME-ALS, 2×5 Small Form Factor Multimode OC-3 LED Transceivers, 7 pgs, May 17, 2002.
OCP DTR-156-SM2-XX-A-L3-IR2, 1 pg, Mar. 25, 1999.
OCP DTR-156-SM2-XX-C-L0-LR1, 1 pg, Mar. 25, 1999.
OCT DTR-156-SM-A-L0-LR1N, OC-03/STM-1 Single Mode Transceiver, 1 pg, Aug. 30, 2001.
OCP DTR-156-SM-L1-CS, Single Mode Transceivers (1×9 pin-out), 4 pgs, Aug. 15, 2000.
OCP DTR-156-SM-LS-A-L0-LR1-N-MSE-ALS, 2×5 Small Form Factor OC-3 Laser Transceivers, 7 pgs, May 29, 2002.
OCP DTR-156-SM-LS-A-L0-LR2-MSE-ALS, 2×5 Small Form Factor OC-3 Laser Transceivers, 7 pgs, May 29, 2002.
OCP DTR-156-SM-LS-A-L3-IR-MSE-ALS, 2×5 Small Form Factor OC-3 Laser Transceivers, 7 pgs, May 15, 2002.
OCP DTR-2488-3.3-SM, 3.3 volt OC-48/STM-16 1×9 Single Mode Transceiver, 5 pgs, May 15, 2000.
OCP DTR-2488-SM, 5 volt OC-48/STM-16 1×9 Single Mode Transceiver, 5 pgs, May 15, 2000.
OCP DTR-2488-SM2, OC-48/STM-16 Single Mode Transceiver, 5 pgs, May 4, 1999.
OCP DTR-2488-SM2-LC & DTR-2488-SM2-LS (ALC), 3.3 volt 2×10 LC connector OC-48 Single Mode Transceiver, 5 pgs, Apr. 13, 2001.
OCP DTR-2488-SM2-LC & DTR-2488-SM2-LS, 3.3 volt 2×10 LC connector OC-48 Single Mode Transceiver, 5 pgs, Mar. 23, 2001.
OCP DTR-2488-SM-LC & DTR-2488-SM-LS, 3.3 volt 2×5 LC connector OC-48 Single Mode Transceiver, 5 pgs, Feb. 2, 2001.
OCP DTR-2488-SM-LC-L1-SR-M-CM, 2×5 Short Reach OC-48 LC Single Mode Transceiver with CML Data interface, 3 pgs, Jul. 15, 2000.
OCP DTR-622-3.3-CS, OC-12 Multimode Transceiver, 1 pg, Dec. 9, 2000.
OCP DTR-622-3.3-SM-L3-IR-CS, 3.3 Volt OC-12/STM-4 Single Mode Transceivers (1×9 pin-out), 1 pg, Dec. 7, 2001.
OCP DTR-622-SD & DTR-622-A-SD, OC-12/STM-4 "SD" 1×9 Multimode Transceiver, 3 pgs, Jun. 10, 1999.
OCP DTR-622-SM "SD" OC-12/STM-4 "SD" 1×9 Single Mode Transceiver, 4 pgs, Nov. 8, 1999.
OCP DTR-622-SM "SE", OC-12/STM-4 "SE" 1×9 Single Mode Transceiver, 4 pgs, Dec. 11, 2000.
OCP DTR-622-SM2-LC-PM & DTR-622-SM2-LS-PM, 3.3 Volt 2×10 LC connector OC-12 Single Mode Transceivers with Receiver Power Monitor, 6 pgs, Nov. 9, 2000.
OCP DTR-622-SM-A-HP-LR2-SL, OC-12/STM-4 "SL" Single Mode Transceivers (1×9 pin-out), 4 pgs, Jan. 11, 2001.
OCP DTR-xxx-3.3 (3.3 Volt Multimode Transceivers) for ATM/SONET/SDH, Fibre Channel FDDI & Fast Ethernet, 9 pgs, Sep. 28, 1999.
OCP DTR-xxx-3.3-SM, 3.3 Volt Single Mode Transceivers (1×9 pin-out), 9 pgs, Mar. 1, 1999.
OCP DTR-xxx-3.3-SM2, 3.3 Volt OC-1 to OC-12 Single Mode Transceivers (2×9 pin-out), 8 pgs, Mar. 30, 1999.
OCP DTR-xxx-3.3-SM-T, 3.3 Volt Single Mode Transceivers (1×9 pin-out), 6 pgs, May 10, 2002.
OCP DTR-xxx-SM, Single Mode Transceivers (1×9 pin-out), 9 pgs, Mar. 1, 1999.
OCP DTR-xxx-SM2 Single Mode Transceivers (2×9 pin-out), 9 pgs, Mar. 10, 1999.
OCP DTR-xxx-SM2-CWDM, CWDM Single Mode Transceivers (2×9 pin-out) 6 pgs, Jan. 18, 2002.
OCP DTR-xxx-SM2-LC & DTR-xxx-SM2-LS, 3.3 Volt 2×10 LC connector OC-3 & OC-12 Single Mode Transceivers, 7 pgs, Jul. 4, 2001.
OCP DTR-xxx-SM-CWDM CWDM Single Mode Transceivers (1×9 pin-out), 6 pgs, Jan. 29, 2002.
OCP DTR-xxx-SM-LC & DTR-xxx-SM-LS, 3.3 Volt 2×5 LC connector OC-3 & OC-12 Single Mode Transceivers, 7 pgs, Sep. 4, 2000.
OCP DWTX-48, OC-48/STM-16 ITU-grid DWDM Transmitters, 5 pgs, Oct. 23, 2001.
OCP Interface Circuits for DTC (2×9 Transceivers with Clock), 2 pgs, Oct. 16, 1998.
OCP Interface Circuits for DTR-SM2 (2×9 Transceivers), 2 pgs, Jan. 16, 1998.
OCP PTC-48, 2.5 Gbits/s Transponder with 16-Channel 155Mbits/s Multiplexer/Demultiplexer with Clock Recovery, 11 pgs, Sep. 5, 2001.
OCP PTC-48SL, Compact size & Low Current consumption, 2.5 Gbits/s Transponder with 16-Channel 155Mbits/s Multiplexer/Demultiplexer with Clock Recovery, 11 pgs, Sep. 5, 2001.
OCP PTC-48SP, Compact size & Low Current consumption, 2.5 Gbits/s Transponder with 16-Channel 155Mbits/s Multiplexer/Demultiplexer with Clock Recovery, 11 pgs, May 9, 2002.
OCP SRC-03, OC-3/STM-1 Receiver with Clock Recovery, 5 pgs, Feb. 8, 1999.
OCP SRC-03-S, OC-3/STM-1 Receiver with Clock Recovery in 24-pin package, 5 pgs, Jul. 7, 1997.
OCP SRC-12, OC-12/STM-4 Receiver with Clock Recovery, 5 pgs, May 3, 1999.
OCP SRC-12-APD, High Sensitivity OC-12/STM-4 APD Receiver with Clock Recovery, 3 pgs, Feb. 7, 2001.
OCP SRC-12-APD-PSC-A-ALC, High Sensitivity OC-12/STM-4 APD Receiver with Clock Recovery, 3 pgs, Mar. 26, 2001.
OCP SRC-12-H, OC-12/STM-4 Receiver with Clock Recovery, 5 pgs, Sep. 29, 1999.
OCP SRC-12-S, OC-12/STM-4 Receiver with Clock Recovery in 24-pin package, 5 pgs, Dec. 7, 1998.
OCP SRC-48, O0C48/STM-16 Receiver with Clock Recovery, 5 pgs, Sep. 16, 2002.
OCP SRX-03-APD, High Sensitivity OC-3/STM-1 APD Receiver, 4 pgs, Apr. 28, 2002.
OCP SRX-12-APD, High Sensitivity OC-12/STM-4 APD Receiver, 4 pgs, Mar. 16, 1998.
OCP SRX-12-L, OC-12/STM-4 Receiver (TTL Signal Detect), 5 pgs, May 3, 1999.
OCP SRX-48 ALC, OC-48/STM-16 Receiver without Clock Recovery, 3 pgs, Mar. 8, 2001.
OCP SRX-48, OC-48/STM-16 Receiver without Clock Recovery, 5 pgs, Sep. 16, 2002.
OCP STX-48-PSC-B-LR-ALC, OC-48/STM-16 Receiver without Clock Recovery, 1 pg, Oct. 19, 2001.
OCP STX/SRX SONET/SDH Transmitters & Receivers, 9 pgs, Feb. 7, 2002.
OCP STX-01-PLC-B-L1-0510-ALC, SONET OC-1 CWDM 1510nm Transmitter, 1 pg, Feb. 7, 2002.
OCP STX-03/SRX-03, OC-3 SONET/SDH Transmitters & Receivers, 5 pgs, Sep. 28, 1999.
OCP STX-03-xxx-L3-IR-D5, OC-3 SONET/SDH Transmitters, 3 pgs, May 7, 1999.
OCP STX-12-PSC-A-L3-IR-ALC, SONET/SDH Transmitter, 3 pgs, Aug. 15, 2000.
OCP STX-200-LED-SW-100, Short Wavelength Transmitter, 2 pgs, Dec. 10, 1997.
OCP STX-48 ALC, OC-48/STM-16 Transmitter, 5 pgs, Mar. 6, 2001.
OCP STX-48, OC-48/STM-16 Transmitter, 5 pgs, Sep. 16, 2002.
OCP STX-48-MS, OC-48/STM-16 Transmitter, 4 pgs, Jul. 23, 2001.
OCP STX-xx-3.3 / SRX-xx-3.3, 3.3 Volt SONET/SDH Transmitters & Receivers, 9 pgs, Mar. 8, 1999.
OCP TRP-48 Single Mode, OC-48/STM-16 LC Small Form-factor Pluggable (SFP) Single Mode Transceivers, 5 pgs, Jul. 25, 2002.
OCP TRP-F2 Single Mode, 3.3V Double Speed Single Mode Fibre Channel LC connector Small Form-factor Pluggable (SFP) Transceivers, 5 pgs, Jul. 3, 2002.

OCP TRP-FE (Multimode), Fast Ethernet (100-FX) LC Small Form-factor Pluggable (SFP) Multimode Transceivers, 5 pgs, Jun. 28, 2002.

OCP TRP-G1 Multi-Mode, 3.3V Gigabit Ethernet 850 nm VCSEL Small Form-factor Pluggable (SFP) Transceivers, 5 pgs, Jun. 27, 2002.

OCP, Optical Communication Products, Inc., Optical Communication Products Announces the Appointment of John Lemasters as its New Chairman, 1 pg, May 9, 2002.

Philips Semiconductors, NE1617 Temperature monitor for microprocessor systems, 16 pgs, Oct. 6, 2004.

Philips Semiconductors, NE1619 HECETA4 Temperature and voltage monitor, 18 pgs, Aug. 29, 2001.

Philips Semiconductors, NE1619 HECETA4 Temperature and voltage monitor, 19 pgs, Oct. 5, 2004.

Piven, J., 3COM's Got Wireless in the Palm of Its Hand-So Far, Technology Review, 3 pgs, May 1999.

Telcordia, Synchronous Optical Network (SONET) Transport Systems: Common Generic Criteria, Issue 4, 697 pgs, Dec. 2005.

Underwriters Laboratories, Optical Communications Products, ISO 9001:1994, 1 pg, Jan. 23, 2002.

www.networknews.co.uk, Shomiti has built itself . . . , 2 pgs, Aug. 29, 2001.

XICOR, Hot Pluggable X9520, Fiber Channel / Gigabit Ethernet Laser Diode Control for Fiber Optic Modules, 34 pgs, Oct. 4, 2002.

* cited by examiner

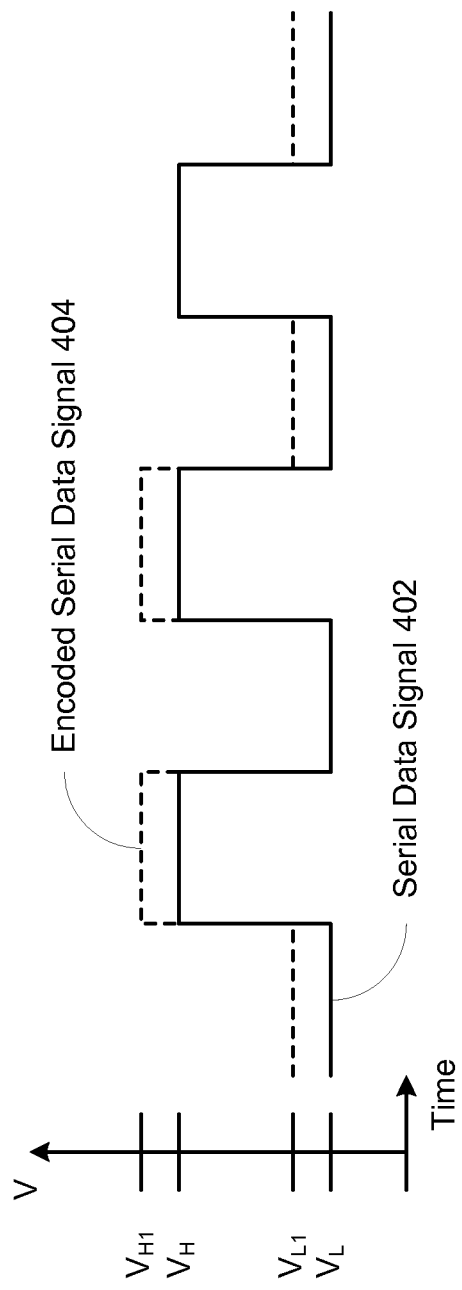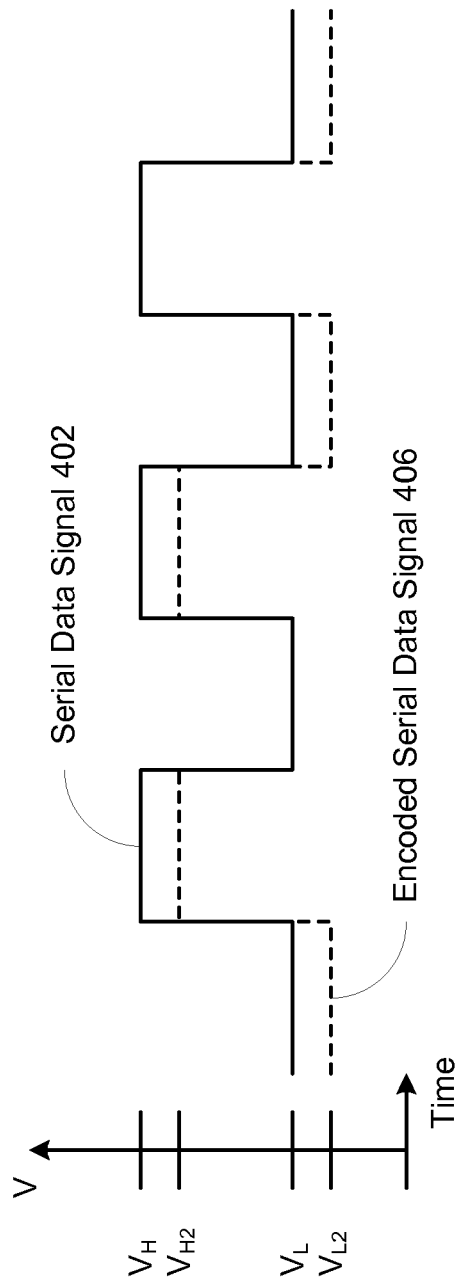

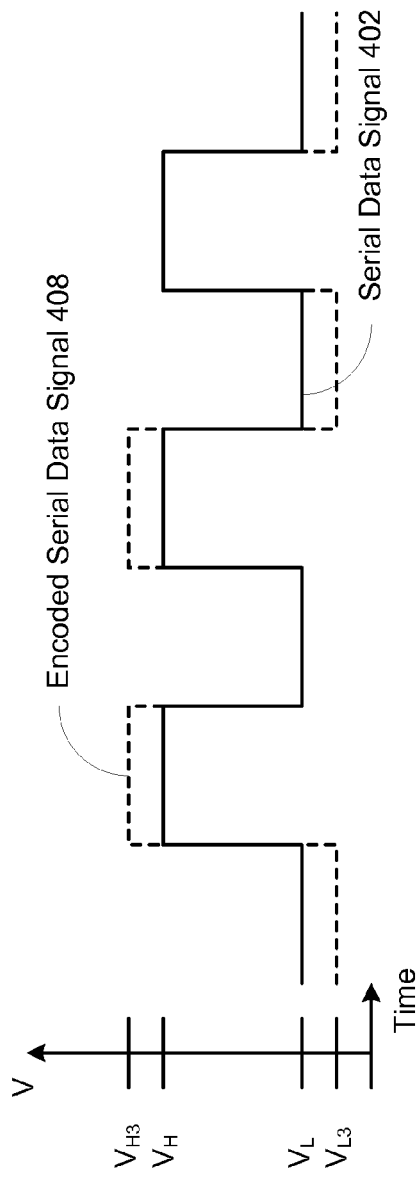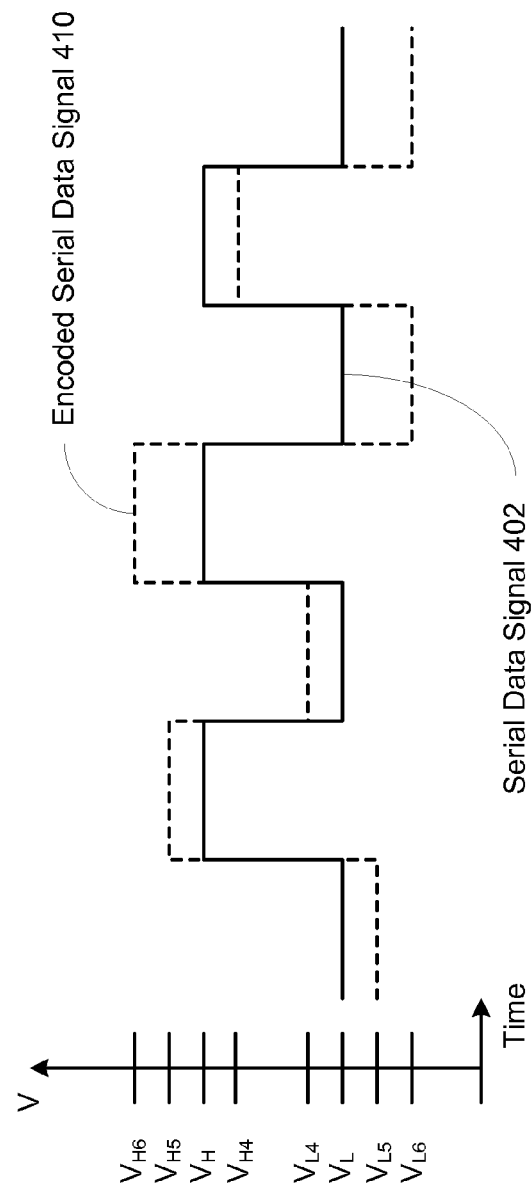

DIAGNOSTICS FOR A SERIAL COMMUNICATIONS DEVICE

RELATED APPLICATIONS

This application is a continuation of U.S. application Ser. No. 12/166,238, filed Jul. 1, 2008, now U.S. Pat. No. 8,159,956, which is hereby incorporated by reference in its entirety.

TECHNICAL FIELD

The disclosed embodiments relate generally to diagnostics for serial communication devices.

BACKGROUND

Hosts, such as storage devices (e.g., hard disk drives and optical drives) and storage device controllers, can communicate with each other via cables. Often, these cables are serial cables which transfer a single bit per clock cycle. Unfortunately, these serial cables do not include mechanisms that can monitor and/or store diagnostic data about the signals sent to and received from the hosts and/or the cables. Thus, the cause of a communication failure or degradation is difficult to determine, i.e. whether the host (or hosts) is failing or whether the serial cable is failing. For example, in a degrading system, a serial cable that is failing may produce the same symptoms (e.g., a degraded signal) as a host that is failing. Therefore, it would be highly desirable to provide a system and method for diagnosing operation or failure of a serial communication bus or link.

SUMMARY

Some embodiments provide a serial communication bus that includes a first module coupled to a second module via a serial cable. Each of these modules can be powered, i.e., receive power. As such, these types of serial communication busses are referred to as powered serial communication busses. The power is generally used to power active circuitry in the first and/or second modules. In some embodiments, each of the first and second modules comprises one or more of: a power interface, a controller, memory, a first interface, and a second interface. The power interface is configured to receive operating power for the respective module from an external power source. The controller is configured to obtain digital diagnostic data representative of operational characteristics of at least the respective module. The memory is configured to store the digital diagnostic data. The first interface is configured to allow an external host to read the digital diagnostic data from the memory. The second interface, which is distinct and separate from the first interface, is configured to serially communicate data to the second module via the serial cable.

In some embodiments, each of the first and second modules also includes a voltage controller and a voltage amplitude sensor. The voltage controller is configured to encode digital diagnostic data onto a serial data signal by adjusting voltage levels of the serial data signal sent to a host. The voltage amplitude sensor is configured to decode digital diagnostic data encoded onto a serial data signal by determining voltage levels of the serial data signal sent from a host.

Some embodiments provide a serial communication bus which includes a serial communications module. In some embodiments, the serial communications module includes a power interface, a controller, a first interface, and a second interface. The power interface is configured to receive operating power for the module from an external power source. The controller is configured to obtain digital diagnostic data representative of operational characteristics of the module, memory configured to store the digital diagnostic data. The first interface is configured to allow an external host to read the digital diagnostic data from the memory. The second interface is configured to serially communicate data to a second module via a serial cable coupled to the second interface circuit.

Some embodiments provide a method, an apparatus, and a computer-readable storage medium for transmitting encoded digital diagnostic data from a powered module to a requestor. In these embodiments, a request for digital diagnostic data for at least the serial cable and the powered module is received from a requestor. The digital diagnostic data is retrieved from memory of the powered module. The digital diagnostic data is then encoded onto a serial data signal while preserving the original data in the serial data signal. The serial data signal is then transmitted to the requestor.

Some embodiments provide a method, an apparatus and a computer-readable storage medium for decoding encoded digital diagnostic data. In these embodiments, a serial data signal which includes encoded digital diagnostic data is received from a sender. The digital diagnostic data is then obtained from the serial data signal. The digital diagnostic data is then stored to memory in a module of a serial cable.

BRIEF DESCRIPTION OF THE DRAWINGS

FIG. 4A illustrates an exemplary voltage plot for a serial data signal in accordance with some embodiments.

FIG. 4B illustrates another exemplary voltage plot for a serial data signal in accordance with some embodiments.

FIG. 4C illustrates another exemplary voltage plot for a serial data signal in accordance with some embodiments.

FIG. 4D illustrates another exemplary voltage plot for a serial data signal in accordance with some embodiments.

Like reference numerals refer to corresponding parts throughout the drawings.

DESCRIPTION OF EMBODIMENTS

Figure 1:
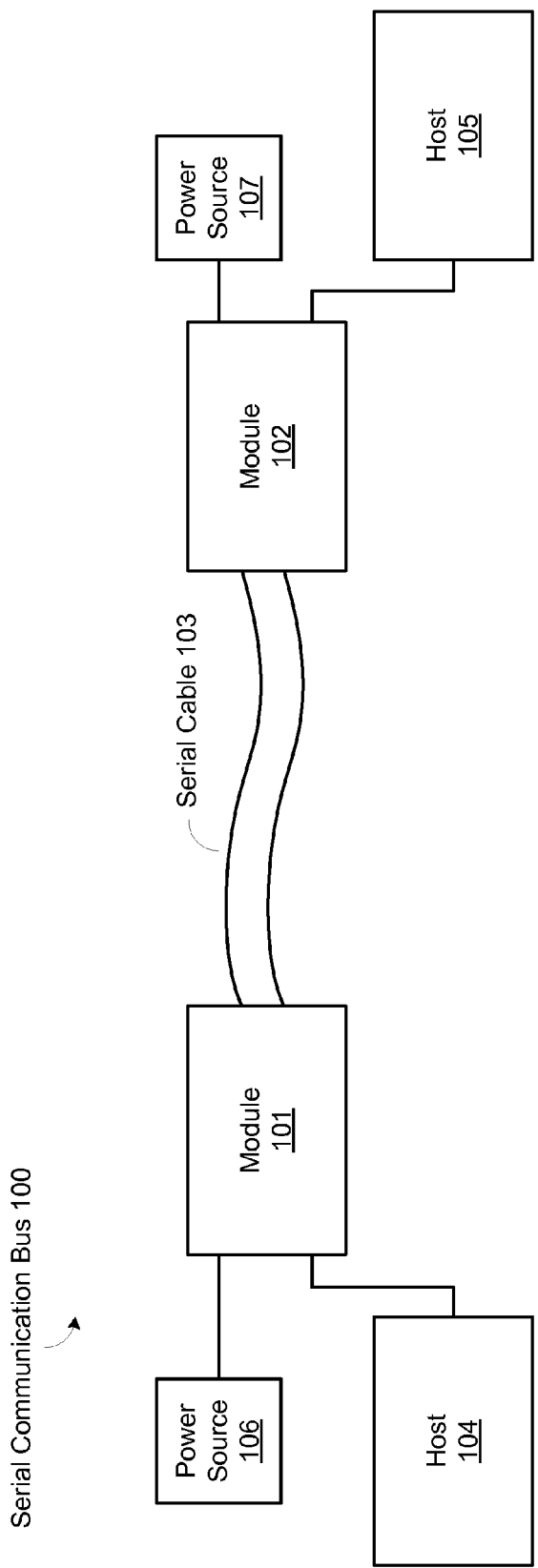
FIG. 1 is a block diagram illustrating an exemplary serial communication bus in accordance with some embodiments.

FIG. 1 is a block diagram illustrating an exemplary serial communication bus 100 in accordance with some embodiments. The serial communication bus 100 includes a module 101 coupled to a module 102 through a serial cable 103. The module 101 can be coupled to one or more hosts 104, 105, either directly or through the serial cable 103, as shown and the module 102 can be coupled to a host 105. In some embodiments, one or more of the modules 101 and 102, and the serial cable 103 are manufactured as a single unit that can be used to couple the one or more hosts 104, 105 to each other. In some embodiments, one or more of the modules 101, 102, and the serial cable 103 are manufactured as separate units that can be assembled by an end user in specified configurations to couple the one or more hosts 104, 105 to each other. In some embodiments, the serial cable 103 and/or the modules 101, 102 can include connectors (not shown) which are compliant with a serial communication standard, such as the Serial Advanced Technology Attachment (SATA) standard or the Serial Attached Small Computer System Interface (SAS) standard. In these embodiments, the modules 101, 102 and the serial cable 103 can communicate with each other using a serial communications protocol defined by the serial communication standard.

Existing serial cables are passive and rely on the hosts to provide the power to drive signals through the serial cables. Thus, in some embodiments, the modules 101, 102 are powered modules that include active circuitry. The active circuitry can include one or more of: active electronic components (e.g., transistors, diodes, processors, analog-to-digital converters, etc.) and passive electronic components (e.g., resistors, capacitors, inductors, etc.). In these embodiments, the modules 101, 102 can be powered by power sources 106, 107, respectively. In some embodiments, the power sources 106, 107 are included in the hosts 104, 105, respectively. Thus, the above-mentioned embodiments can be used to provide a powered SATA and/or a powered SAS serial cable. Note that the modules 101, 102 are described in more detail with reference to FIGS. 2-6 below.

In some embodiments, the serial cable 103 includes one or more of an optical cable and an electrically-conductive cable. The optical cable can include one or more optical fibers. Similarly, the electrically-conductive cable can include one or more electrically-conductive cables and/or wires. A hybrid cable (not shown) can include both electrically-conductive cables and optical fibers.

Figure 2:
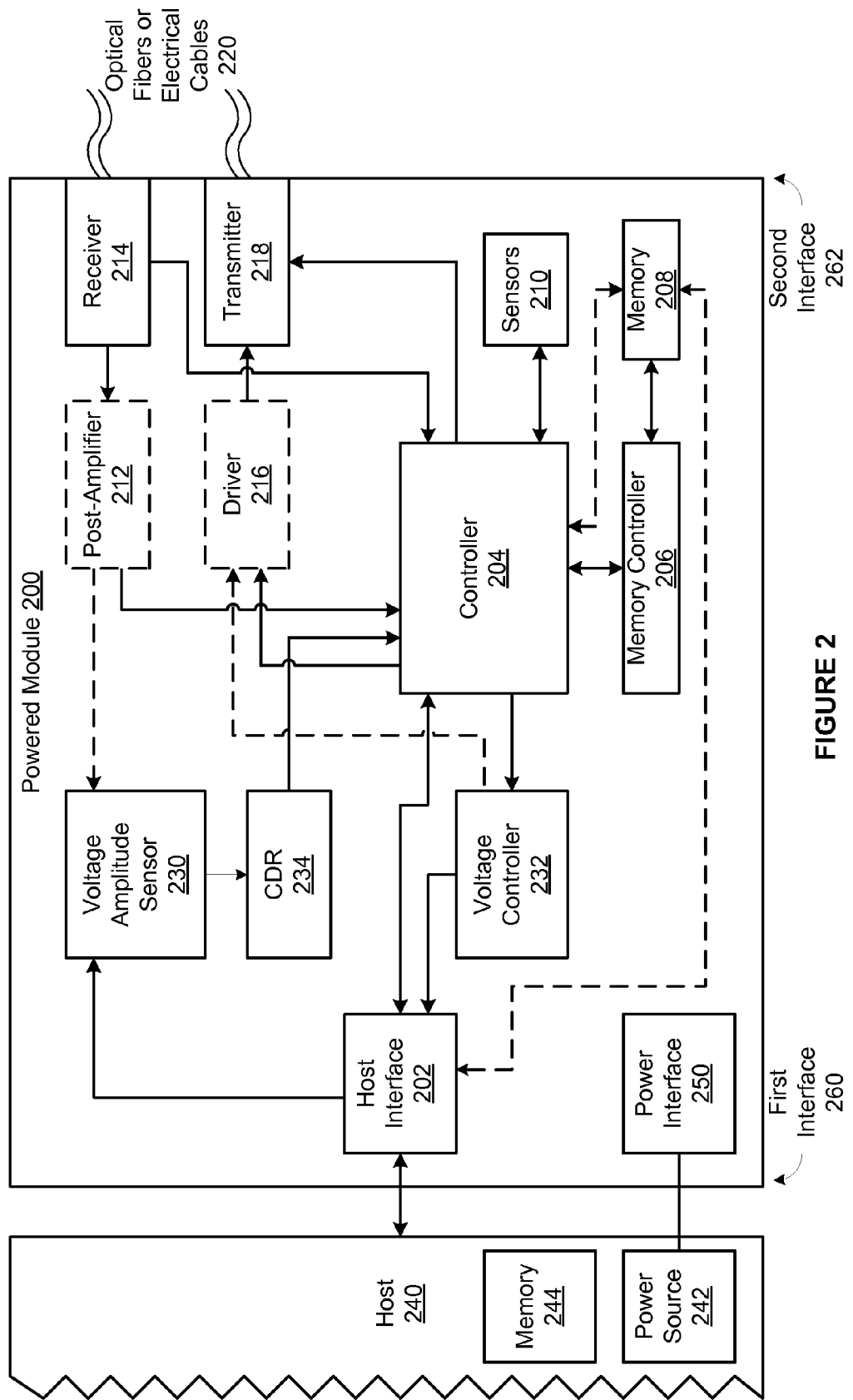
FIG. 2 is a block diagram illustrating an exemplary powered module for a serial cable in accordance with some embodiments.

FIG. 2 is a block diagram illustrating a powered module 200 for a serial cable (e.g., the serial cable 103 in FIG. 1) in accordance with some embodiments. The powered module 200 can be any one of the modules 101, 102 in FIG. 1. As illustrated in FIG. 2, the powered module 200 is coupled to a host 240. Note that the host 240 can be any one of the hosts 104, 105 illustrated in FIG. 1. The powered module 200 can also be coupled to optical fibers or electrical cables 220 which can transmit data encoded in optical signals from the powered module 200 to another powered module (e.g., the modules 101, 102 in FIG. 1) or to another host (e.g., the hosts 104, 105 in FIG. 1) via a first interface 260. In some embodiments, the optical fibers or electrical cable 220 are coupled to the second interface 262.

The powered module 200 includes one or more of: a host interface 202, a controller 204, a memory controller 206, a memory 208, a post-amplifier 212, sensors 210, a receiver 214, a driver 216, a transmitter 218, a power interface 250, a voltage amplitude sensor 230, a voltage controller 232, and a clock data recovery (CDR) circuit 234. Note that for an optoelectronic module, the post-amplifier 212, the receiver 214, the driver 216, and the transmitter 218 can be referred to as an optical interface (e.g., the second interface 262) for the optical fibers 220. Alternatively, for an electrical module, the receiver 214 and the transmitter 218 can be referred to as an electrical interface (e.g., the second interface 262) for the cables 220. Similarly, one or more of the host interface 202 and the power interface 250 can be referred to as the first interface 260.

In some embodiments, the memory 208 can include a magnetic or optical disk storage device, solid state storage devices such as Flash memory, or other non-volatile and/or volatile memory device or devices. In some embodiments, the memory 208 includes a non-volatile memory for storing programs and/or data and includes a volatile memory that can be used during the runtime of the stored programs.

In some embodiments, the host interface 202 allows the host 240 to communicate with the powered module 200. For example, the host interface 202 can allow the host 240 to access data stored in the memory 208. Similarly, the host interface 202 can allow the host 240 to send data and/or commands through and to receive data and/or commands from the optical fibers or electrical cables 220. In some embodiments, the host interface 202 allows the host 240 to read data from and/or to write data to the memory 208. In some embodiments, data can be read from and/or written to the memory 208. The data can include digital diagnostic data for the powered module 200 and/or the optical fibers or electrical cables 220. In some embodiments, the digital diagnostic data includes one or more of: one or more serial number, transfer speed of the serial cable, a voltage amplitude and/or a power level of a signal received from the serial cable, a voltage amplitude and/or a power level of a signal received from the host, an optical power level of an optical signal received from the serial cable, measures of signal quality (e.g., vertical and horizontal eye opening sizes for signals received from the serial cable), an expected signal loss based on the type of the serial cable, number of faults, power supply voltage for powered module, bias current level for an optical transceiver, a status of an equalizer for a receiver in the powered module (e.g., decision feedback equalizer coefficients and/or analog settings), a pre-emphasis and receiver equalization settings and thresholds, and the number of times the serial cable has been plugged in. In some embodiments, the data and/or commands received at the host 240 can be stored in the memory 244 within the host 240. In some embodiments, the host interface 202 is an electrical interface. In some embodiments, the host interface 202 communicates with the host 240 using one or more of: a Serial Advanced Technology Attachment (SATA) protocol, and a Serial Attached Small Computer System Interface (SAS) protocol.

In some embodiments, the controller 204 can perform a number of operations, including but not limited to, managing tasks within the powered module 200, controlling components within the powered module 200, monitoring operating characteristics of the powered module 200 and/or the optical fibers or electrical cables 220, and accessing data, such as digital diagnostic data representative of operational characteristics of the powered module 200 and/or the optical fibers or electrical cables 220.

In some embodiments, the controller 204 can receive commands issued by the host 240 through the host interface 202 instructing the controller 204 to retrieve data from the memory 208. In these embodiments, the controller 204 issues read commands to the memory controller 206, which in turn retrieves the requested data from specified locations within the memory 208 and returns the requested data to the controller 204. Alternatively, the memory controller 206 can be optional and the controller 204 issues read commands directly to the memory 208. The controller 204 then returns the requested data to the host 240 through the host interface 202. In some embodiments, the data includes digital diagnostic data for the powered module 200 and/or the optical fibers or electrical cables 220. In some embodiments, the host 240 can read data directly from the memory 208, bypassing the controller 204.

In some embodiments, the controller 204 can receive commands and/or data issued by the host 240 through the host interface 202 instructing the controller 204 to write the received data to the memory 208. In these embodiments, the controller 204 issues write commands including the received data to the memory controller 206, which in turn writes the requested digital diagnostic data to specified locations within the memory 208. Alternatively, the memory controller 206 can be optional and the controller 204 issues write commands including the received data directly to the memory 208. In some embodiments, the data includes digital diagnostic data for the powered module 200 and/or the optical fibers or electrical cables 220. In some embodiments, the host 240 can write the data directly to the memory 208, bypassing the controller 204.

In some embodiments, the controller 204 can receive commands from another powered module (not shown) coupled to the optical fibers or electrical cables 220 or from another host coupled to the optical fibers or electrical cables 220 (not shown) instructing the controller 204 to retrieve data from the memory 208.

When the optical fibers or electrical cables 220 include optical fibers, optical signals including the commands are sent through the optical fibers 220 to the receiver 214 which converts the optical signals into electrical signals. In some embodiments, the receiver 214 is a photodiode which can convert optical signals into electrical signals. These electrical signals can first be sent to the post-amplifier 212, which generates a fixed output signal, before being sent to the controller 204. Alternatively, the electrical signals can be sent to the controller 204 without first being processed by the post-amplifier 212. In some embodiments, if the optical signals include serialized commands, the serialized commands can first be deserialized to reconstruct the commands. The controller 204 then issues read commands to the memory controller 206, which in turn retrieves the requested data from specified locations within the memory 208 and returns the requested data to the controller 204. Alternatively, the controller 204 issues read commands directly to the memory 208 to retrieve the requested data from specified locations within the memory 208 and returns the requested data to the controller 204. The controller 204 can then send the data to the driver 216, which drives the transmitter 218. In some embodiments, the transmitter 218 is a laser transmitter and the driver 216 is a laser driver. Alternatively, the controller 204 can send the data to the transmitter 218 without using the driver 216. In either case, the transmitter 218 converts the electrical signals into optical signals which are then transmitted through the optical fibers 220 to the other powered module or to the other host. In some embodiments, the data can first be serialized before being transmitted through the optical fibers 220. In some embodiments, the data includes digital diagnostic data for the powered module 200 and/or the optical fibers 220.

When the optical fibers or electrical cables 220 include electrical cables, electrical signals including the commands are sent through the electrical cables 220 to the receiver 214. In some embodiments, if the electrical signals include serialized commands, the serialized commands can first be deserialized to reconstruct the commands. The controller 204 then issues read commands to the memory controller 206, which in turn retrieves the requested data from specified locations within the memory 208 and returns it to the controller 204. Alternatively, the controller 204 issues read commands directly to the memory 208 to retrieve the requested data from specified locations within the memory 208 and returns the requested data to the controller 204. The controller 204 can then send the data to the transmitter 218. The transmitter 218 then transmits the data through the electrical cables 220 to the other powered module or to the other host. In some embodiments, the data can first be serialized before being transmitted through the electrical cables 220. In some embodiments, the data includes digital diagnostic data for the powered module 200 and/or the electrical cables 220.

In some embodiments, the controller 204 can receive commands and/or data from another powered module (not shown) coupled to the optical fibers or electrical cables 220 or from another host coupled to the optical fibers or electrical cables 220 (not shown) instructing the controller 204 to store data to the memory 208.

When the optical fibers or electrical cables 220 include optical fibers, optical signals including the commands and/or the data are sent through the optical fibers 220 to the receiver 214 which converts the optical signals into electrical signals. These electrical signals can first be sent to the post-amplifier 212 before being sent to the controller 204. Alternatively, the electrical signals can be sent directly to the controller 204. In some embodiments, if the optical signals include serialized commands, the serialized commands can first be deserialized to reconstruct the commands. The controller 204 then issues write commands including the data to the memory controller 206, which in turn writes the data to specified locations within the memory 208. Alternatively, the controller 204 issues write commands including the data directly to the memory 208 to write the data to specified locations within the memory 208. In some embodiments, the data includes digital diagnostic data for the powered module 200 and/or the optical fibers 220.

When the optical fibers or electrical cables 220 include electrical cables, electrical signals including the commands and/or the data are sent through the electrical cables 220 to the receiver 214. These electrical signals can be sent to the controller 204. In some embodiments, if the electrical signals include serialized commands, the serialized commands can first be deserialized to reconstruct the commands. The controller 204 then issues write commands including the data to the memory controller 206, which in turn writes the requested data to specified locations within the memory 208. Alternatively, the controller 204 issues write commands including the data directly to the memory 208 to write the data to specified locations within the memory 208. In some embodiments, the data includes digital diagnostic data for the powered module 200 and/or the electrical cables 220.

In some embodiments, the host 240 can send data and/or commands to another host (not shown) or another powered module (not shown) through the optical fibers or electrical cables 220.

When the optical fibers or electrical cables 220 include optical fibers, the host 240 can send the data and/or the commands to the host interface 202. The host interface 202 can then send the data and/or the commands to the driver 216, which drives the transmitter 218. The transmitter 218 then converts the electrical signals into optical signals which are sent through the optical fibers 220 to the other host or to the other powered module. Alternatively, the host interface 202 can send the data and/or commands to the controller 204, which can send the data and/or commands to the driver 216 or the transmitter 218. Alternatively, the host interface 202 can send the data and/or the commands to the driver 216 or the transmitter 218, bypassing the controller 204. In some embodiments, the data and/or commands are first serialized before being transmitted through the optical fibers 220.

When the optical fibers or electrical cables 220 include electrical cables, the host 240 can send the data and/or the commands to the host interface 202. The host interface 202 can send the data and/or the commands to the transmitter 218. The transmitter 218 transmits the data and/or commands through the electrical cables 220 to the other host or to the other powered module. Alternatively, the host interface 202 can send the data and/or commands to the controller 204, which can send the data and/or commands to the transmitter 218. Alternatively, the host interface 202 can send the data and/or commands to the transmitter 218, bypassing the controller 204. In some embodiments, the data and/or commands are first serialized before being transmitted through the electrical cables 220.

In some embodiments, the host 240 can receive data and/or commands from another host (not shown) or another powered module (not shown) through the optical fibers or electrical cables 220.

When the optical fibers or electrical cables 220 include optical fibers, optical fibers, the receiver 214 can receive data and/or commands through the optical fibers 220 from the other host or the other powered module. The receiver 214 converts the optical signals into electrical signals. In some embodiments, if the data and/or the commands are serialized, they are first deserialized. The receiver 214 can send the data and/or the commands to the post-amplifier 212, which sends the data to the controller 204. The controller 204 can then send the data and/or the commands to the host interface 202. Alternatively, the receiver 214 can send the data and/or the commands to the controller 204, bypassing the post-amplifier 212. Alternatively, the receiver 214 or the post-amplifier 212 can send the data and/or the command to the host interface 202, bypassing the controller 204. The host interface 202 then sends the data and/or the commands to the host 240.

When the optical fibers or electrical cables 220 include electrical cables, the receiver 214 can receive data and/or commands through the electrical cables 220 from the other host or the other powered module. In some embodiments, if the data and/or the commands are serialized, they are first deserialized. The receiver 214 can send the data and/or the commands to the controller 204. The controller 204 can then send the data and/or the commands to the host interface 202. Alternatively, the receiver 214 can send the data and/or the command to the host interface 202, bypassing the controller 204. The host interface 202 then sends the data and/or the commands to the host 240.

In some embodiments, the host 240 receives additional data (e.g., digital diagnostic data) encoded in a serial data signal. For example, the serial data signal can include data and/or commands used by two hosts to communicate with each other, as described above. In some embodiments, the additional data can be encoded onto a serial data signal while preserving the original data in serial data signal. For example, for a given data bit, the data bit can include the original data as well as the additional data. These embodiments are beneficial in systems where the standard requires a specified protocol to be used when transmitting data to and from hosts.

FIGS. 4A-4D illustrate exemplary technique for encoding additional data (e.g., digital diagnostic data) onto serial data signals. In FIGS. 4A-4D, an exemplary serial data signal 402 can have a high voltage level ($V_H$) and a low voltage level ($V_L$). The high voltage level can correspond to a logical one and the low voltage level can correspond to a logical zero. In FIGS. 4A-4D, the serial data signal 402 includes the following data: 0101010.

In some embodiments, an encoded serial data signal can be produced from the serial data signal 402 by modifying the high voltage level and the low voltage level of the serial data signal 402. The encoded serial data signal can include additional data, such as digital diagnostic data. For example, the voltage controller 232 in FIG. 2 can be configured to adjust the amplitude of the voltage level for the serial data signal 402 to encode additional data onto the serial data signal 402. In some embodiments, the voltage level for the serial data signal is adjusted based on the additional data to be encoded onto the serial data signal 4502 and a voltage map which maps data values to voltage levels. In doing so, the encoded serial data signal can be produced. When an encoded serial data signal is received, the encoded serial data signal can be decoded. For example, the voltage amplitude sensor 230 in FIG. 2 can be configured to determine the amplitude of the voltage level for the encoded serial data signal. In some embodiments, a voltage map can be used to map the determined amplitude of the voltage level to one or more data values. In doing so, the additional data encoded on the encoded serial data signal can be extracted.

In some embodiments, the high voltage level and the low voltage levels of the serial data signal 402 are adjusted by a specified voltage (e.g., a specified percentage increase or decrease) to produce encoded serial data signals that include additional data. In some embodiments, the new high voltage level and the new low voltage level can be selected to be within the noise margins for the high voltage level and the low voltage level of a receiver which receives the encoded serial data signal. In other words, the receiver can detect a high voltage level (e.g., the original data) when the encoded serial data signal is either at the original high voltage level or at the new high voltage level (or anywhere in between). Similarly, the receiver can detect a low voltage level (e.g., the original data) when the encoded serial data signal is either at the original low voltage level or at the new low voltage level (or anywhere in between). Thus, both the original data in the serial data signal 402 and the additional data can be encoded onto the serial data signal 402. Using this encoding technique, the original high voltage level and the original low voltage level can be used to represent a logical zero for the additional data, whereas the new high voltage level and the new low voltage level can be used to represent a logical one for the additional data. Alternatively, the original high voltage level and the original low voltage level can be used to represent a logical one for the original data, whereas the new high voltage level and the new low voltage level can be used to a represent logical zero for the additional data. These embodiments are illustrated in FIGS. 4A-4D.

In FIG. 4A, the high voltage level and the low voltage level of the serial data signal 402 have been increased by a specified voltage (e.g., a specified percentage increase) at specified bits of the serial data signal 402 to produce an encoded serial data signal 404 with the following additional data: 1101101. As illustrated in FIG. 4A, the new voltage levels $V_{H1}$ and $V_{L1}$ are used to encode logical ones for the encoded serial data signal 404. When the encoded serial data signal 404 is at $V_{H1}$ (e.g., when the serial data signal 402 is high) or at $V_{L1}$ (e.g., when the serial data signal 402 is low), a logical one is detected for the additional data, and when the encoded serial data signal 404 is at $V_H$ or $V_L$, a logical zero is detected for the additional data. Thus, in addition to the original serial data signal 402, the additional data (e.g., 1101101) encoded in the encoded serial data signal 404 can be extracted. Note that the role of $V_H$, $V_{H1}$, $V_L$, and $V_L$, can be mapped in any combination. For example, $V_H$ can correspond to a logical one for the additional data, $V_{H1}$ can correspond to a logical zero for the additional data, $V_L$ can correspond to a logical zero for the additional data, and $V_L$ can correspond to a logical one for the additional data. In some embodiments, a voltage encoding map can be used to decode data encoded using this technique.

In FIG. 4B, the high voltage level and the low voltage level of the serial data signal 402 have been decreased by a specified voltage (e.g., a specified percentage decrease) at specified bits of the serial data signal 402 to produce an encoded serial data signal 406 with the same additional data as described in FIG. 4A (e.g., 1101101). As illustrated in FIG.

4B, the new voltage levels $V_{H2}$ and $V_{L2}$ are used to encode logical ones for the encoded serial data signal 406. When the encoded serial data signal 406 is at $V_{H2}$ (e.g., when the serial data signal 402 is high) or at $V_{L2}$ (e.g., when the serial data signal 402 is low), a logical one is detected, and when the encoded serial data signal 406 is at $V_H$ or $V_L$, a logical zero is detected. Thus, in addition to the original serial data signal 402, the additional data (e.g., 1101101) encoded in the encoded serial data signal 406 can be extracted. As noted above, the roles of $V_H$, $V_{H2}$, $V_L$, and $V_{L2}$ can be mapped in any combination. Again, a voltage encoding map can be used to decode data encoded using this technique.

In FIG. 4C, the high voltage level and the low voltage level of the serial data signal 402 have been increased and decreased, respectively, by a specified voltage (e.g., a specified percentage increase and decrease, respectively) at specified bits of the serial data signal 402 to produce an encoded serial data signal 408 with the same additional data as described in FIG. 4A (e.g., 1101101). As illustrated in FIG. 4C, the new voltage levels $V_{H3}$ and $V_{L3}$ are used to encode logical ones for the encoded serial data signal 408. When the encoded serial data signal 408 is at $V_{H3}$ (e.g., when the serial data signal 402 is high) or at $V_{L3}$ (e.g., when the serial data signal 402 is low), a logical one is detected, and when the encoded serial data signal 408 is at $V_H$ or $V_L$, a logical zero is detected. Thus, in addition to the original serial data signal 402, the additional data (e.g., 1101101) encoded in the encoded serial data signal 408 can be extracted. As noted above, the roles of $V_H$, $V_{H3}$, $V_L$, and $V_{L3}$ can be mapped in any combination. Again, a voltage encoding map can be used to decode data encoded using this technique.

Note that any combination of increased or decreased voltage levels can be used. Furthermore, a plurality of voltage levels can be used. For example, in FIG. 4D, the additional data can be encoded onto a plurality of voltage levels $V_{H4}$, $V_{H5}$, $V_{H6}$, $V_{L4}$, $V_{L5}$, and $V_{L6}$. A exemplary voltage mapping for the additional data may be: $V_H=0$, $V_{H4}=1$, $V_{H5}=2$, $V_{H6}=3$, $V_L=0$, $V_{L4}=1$, $V_{L5}=2$, and $V_{L6}=3$. Thus, the additional data encoded in the encoded serial data signal 410 is: 2, 2, 1, 3, 3, 1, 3. Again, a voltage encoding map can be used to decode data encoded using this technique.

Other encoding techniques can be used, including, but not limited to, reencoding the original serial data signal and the additional data onto one or more adjusted voltage levels. For example, consider an encoding technique where the original high voltage level is 1.5V and the original low voltage level is 0V. The new high voltage level can then be set to 1.6V and the new low voltage level can be set to 0.1V. Since there are two data streams to be encoded (e.g., the original serial data stream and the additional diagnostics data stream) onto a single serial data stream, there are four possible combinations of logical values of the two data streams: (state 1) 0 for the original data and 0 for the additional data, (state 2) 0 for the original data and 1 for the additional data, (state 3) 1 for the original data and 0 for the additional data, (state 4) 1 for the original data and 1 for the additional data. The following exemplary voltage encoding can be used: the 0V level is associated with state 1, the 0.1V level is associated with state 2, the 1.5V level is associated with state 3, and the 1.6V level is associated with state 4. Note that any variations on the specified voltage levels, the combinations of logical values within a given state, and/or the mapping of those combinations to the specified voltage levels can be used. In order to use this type of reencoding, the transmitters and/or receivers (and/or associated circuitry such as the controllers) need to be configured to use the appropriate voltage encoding map to decode the encoded serial data signal to extract the original serial data and the additional data.

Returning to FIG. 2, when the optical fibers or electrical cables 220 include optical fibers, in some embodiments, the voltage amplitude sensor 230 receives electrical signals from the post-amplifier 212 or the receiver 214 (not shown in FIG. 2). In these embodiments, the electrical signal can be encoded using a technique as described above. In some embodiments, the amplitude of an optical signal received through the optical fibers 220 is adjusted so that electrical signals produced by the receiver 214 and/or the post-amplifier 212 include voltage levels that can be used to encode additional data onto the original serial data signal (e.g., as described above).

In some embodiments, when the optical fibers or electrical cables 220 include electrical cables, the voltage amplitude sensor 230 receives electrical signals from the receiver 214 (not shown in FIG. 2). In these embodiments, the electrical signal can be encoded using a technique as described above. In some embodiments, the amplitude of an electrical signal received through the electrical cables 220 is adjusted so that electrical signals produced by the receiver 214 include voltage levels that can be used to encode additional data onto the serial data signal (e.g., as described above).

In some embodiments, when the optical fibers or electrical cables 220 include optical fibers, the optical signals received through the optical fibers 220 include both the original serial data and the additional data in an uncombined form (e.g., the additional data signal is not encoded onto the original serial data signal). For example, the original serial data and the additional data can be transmitted on different optical carrier frequencies in parallel in the same optical fiber. Similarly, the original serial data and the additional data can be transmitted through parallel optical fibers. In these embodiments, the controller 204 can receive the separate signals from the receiver 214 or the post-amplifier 212 and process them according to specified rules and/or commands. For example, the controller 204 can send the original serial data to the host interface 202, which in turn transmits the original serial data to the host 240. Alternatively, the controller 204 can send the original serial data and the additional data to the voltage controller 232 so that the additional data can be encoded onto the original serial data prior to being sent to the host 240.

In some embodiments, when the optical fibers or electrical cables 220 include electrical signals, the electrical signal received through the electrical cables 220 includes both the original serial data and the additional data in an uncombined form (e.g., the additional data signal is not encoded onto the original serial data signal). For example, the original serial data and the additional data can be transmitted on parallel cables and/or wires. In these embodiments, the controller 204 can receive the separate signals from the receiver 214 and process them according to specified rules and/or commands. For example, the controller 204 can send the original serial data to the host interface 202, which in turn transmits the original serial data to the host 240. Alternatively, the controller 204 can send the original serial data and the additional data to the voltage controller 232 so that the additional data can be encoded onto the original serial data prior to being sent to the host 240.

In some embodiments, when the optical fibers or electrical cables 220 include optical fibers, the optical signals received through the optical fibers 220 includes both the original serial data and the additional data in encoded form (e.g., using the techniques described above or other techniques). In these embodiments, the receiver 214 or the post-amplifier 212 can decode the encoded signal to extract the original serial data and the additional data.

In some embodiments, when the optical fibers or electrical cables 220 include electrical cables, the electrical signals received through the electrical cables 220 includes both the original serial data and the additional data in encoded form (e.g., using the techniques described above or other techniques). In these embodiments, the receiver 214 can decode the encoded signal to extract the original serial data and the additional data.

In some embodiments, when the optical fibers or electrical cables 220 include optical fibers, the voltage controller 232 encodes additional data onto an original serial data signal which is to be converted into optical signals by the transmitter 218 for transmission through the optical fibers 220. For example, the encoding techniques described above can be used. In some embodiments, the amplitude of an optical signal generated by the transmitter 218 is adjusted so that electrical signals produced by a receiver and/or a post-amplifier include voltage levels that can be used to encode additional data onto the original serial data signal (e.g., as described above).

In some embodiments, when the optical fibers or electrical cables 220 include electrical cables, the voltage controller 232 encodes additional data onto a original serial data signal which is to be transmitted by the transmitter 218 through the electrical cables 220. For example, the encoding technique described above can be used. In some embodiments, the amplitude of an electrical signal generated by the transmitter 218 is adjusted so that electrical signals produced by a receiver include voltage levels that can be used to encode additional data onto the original serial data signal (e.g., as described above).

In some embodiments, when the optical fibers or electrical cables 220 include optical fibers, the optical signal transmitted through the optical fibers 220 includes both the original serial data and the additional data in an uncombined form (e.g., the additional data signal is not encoded onto the original serial data signal). For example, the original serial data and the additional data can be transmitted on different optical carrier frequencies in parallel in the same optical fiber. Similarly, the original serial data and the additional data can be transmitted through parallel optical fibers.

In some embodiments, when the optical fibers or electrical cables 220 include electrical cables, the electrical signals transmitted through the electrical cables 220 include both the original serial data and the additional data in an uncombined form (e.g., the additional data signal is not encoded onto the original serial data signal). For example, the original serial data and the additional data can be transmitted on parallel cables.

In some embodiments, when the optical fibers or electrical cables 220 include optical fibers, the optical signal transmitted through the optical fibers 220 includes both the original serial data and the additional data in encoded form (e.g., using the techniques described above or other techniques). In these embodiments, the driver 216 or the transmitter 218 can encode the original serial data and the additional data onto a single signal stream.

In some embodiments, when the optical fibers or electrical cables 220 include electrical cables, the electrical signals transmitted through the electrical cables 220 includes both the original serial data and the additional data in encoded form (e.g., using the techniques described above or other techniques). In these embodiments, the transmitter 218 can encode the original serial data and the additional data onto a single signal stream.

In some embodiments, the sensors 210 include one or more of voltage sensors, current sensors, temperature sensors, and accelerometers.

The CDR circuit 234 can be used to extract data from a data stream when an associated clock is not sent with the data stream. Note that CDR circuits are well known in the art.

In some embodiments, the power interface 250 can be coupled to the power source 242 in the host 240. In other embodiments, the power interface 250 can be coupled to a power source that is external to the host 240.

As mentioned above, the host 240 typically communicates with another host using a specified communication protocol defined in a specified standard (e.g., SAS or SATA). Although the host 240 can communicate with the powered module using the specified communication protocol, in some embodiments, the powered module 200 can use a different communication protocol when sending the data and/or commands through the optical fibers or electrical cables 220 to another powered module. In these embodiments, the powered module 200 performs the required translations between the different communication protocols. In other embodiments, the powered module 200 uses the same communication protocol as the host 240 when sending the data and/or commands to another host.

Note that the powered module 200 can include more or fewer components than illustrated in FIG. 2. Furthermore, the individual components can be combined with each other. For example, when the optical fibers or electrical cables 220 include optical fibers, the receiver 214 and the post-amplifier 212 can be combined into a single component, and the transmitter 218 and the driver 216 can be combined into a single component. Similarly, when the optical fibers or electrical cables 220 include electrical cables, the receiver 214 and the transmitter 218 can be combined into a single component.

Figure 3:
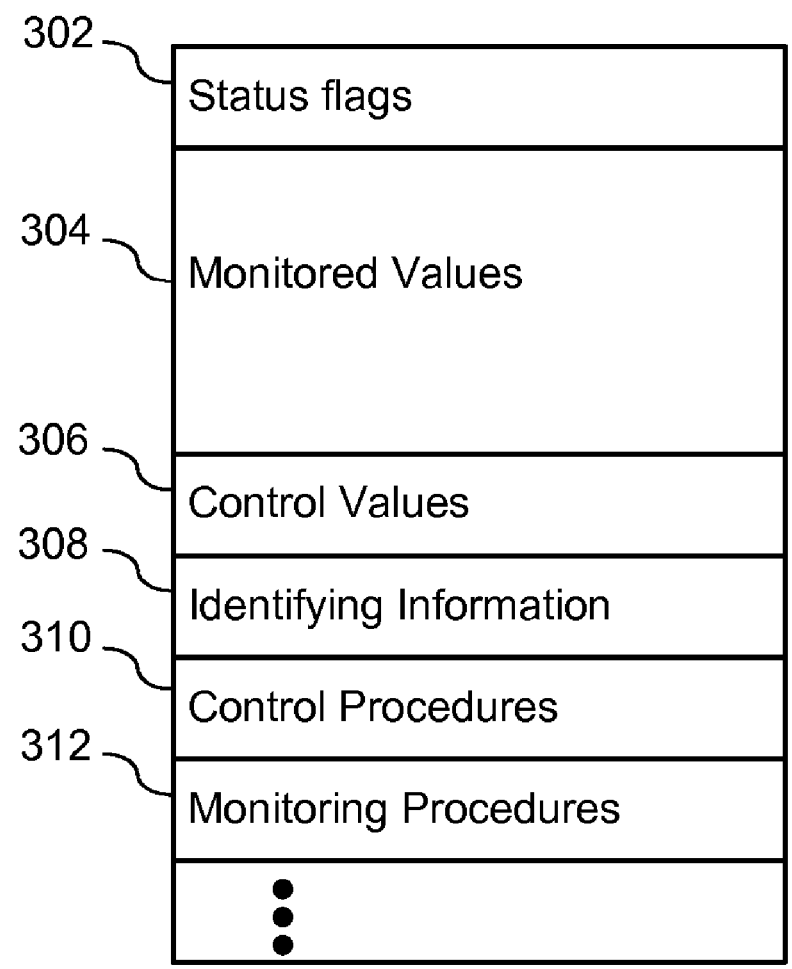
FIG. 3 illustrates an exemplary memory map of a memory for a powered module in accordance with some embodiments.

FIG. 3 illustrates an exemplary memory map 300 of a memory for a powered module in accordance with some embodiments. In some embodiments, the memory map 300 can be a memory map for the memory 208 in FIG. 2. In some embodiments, the memory map 300 can be a memory map for the memory 244 in FIG. 2. An exemplary memory map is presented in Table 1.

In some embodiments the memory stores the following programs, modules and data structures, or a subset thereof: status flags 302, monitored values 304, control values 306, identifying information 308, control procedures 310, and monitoring procedures 312.

The status flags 302 may include comparisons of operating conditions with warning alarms. In some embodiments, the status flags 302 may include low and high level alarm flags.

The monitored values 304 may include values associated with an operating condition of the powered module. These values can also be referred to as digital diagnostic data. For example, the digital diagnostic data can include one or more of: one or more serial number, transfer speed of the serial cable, a voltage amplitude and/or a power level of a signal received from the serial cable, a voltage amplitude and/or a power level of a signal received from the host, an optical power level of an optical signal received from the serial cable, measures of signal quality (e.g., vertical and horizontal eye opening sizes for signals received from the serial cable), an expected signal loss based on the type of the serial cable, number of faults, power supply voltage for powered module, bias current level for an optical transceiver, a status of an equalizer for a receiver in the powered module (e.g., decision feedback equalizer coefficients and/or analog settings), a pre-emphasis and receiver equalization settings and thresholds, and the number of times the serial cable has been plugged in.

Exemplary status flags and monitored values are presented in Table 2, and exemplary alarm and warning flags are presented in Table 3.

The control values 306 may include values associated with controlling the operation of the powered module, e.g., threshold values or the like. Exemplary configuration and/or control values are presented in Table 4.

The identifying information 308 may include information identifying the powered module, the cables, and/or the components within the powered module. The identifying information can include serial numbers or other types of identifiers. Note that the identifying information can also be included in the digital diagnostic data.

In some embodiments, the memory may include the control procedures 310 and the monitoring procedures 312 which can be executed by a controller and/or a processor within the powered module (e.g., the controller 204). The control procedures 310 may include programs used in the operation of the transmitter and the receiver. The monitoring procedures 312 may include programs used to monitor the status of components and to take measurements of operating conditions associated with the components (e.g., voltages, temperatures, optical power, etc.).

Figure 5:
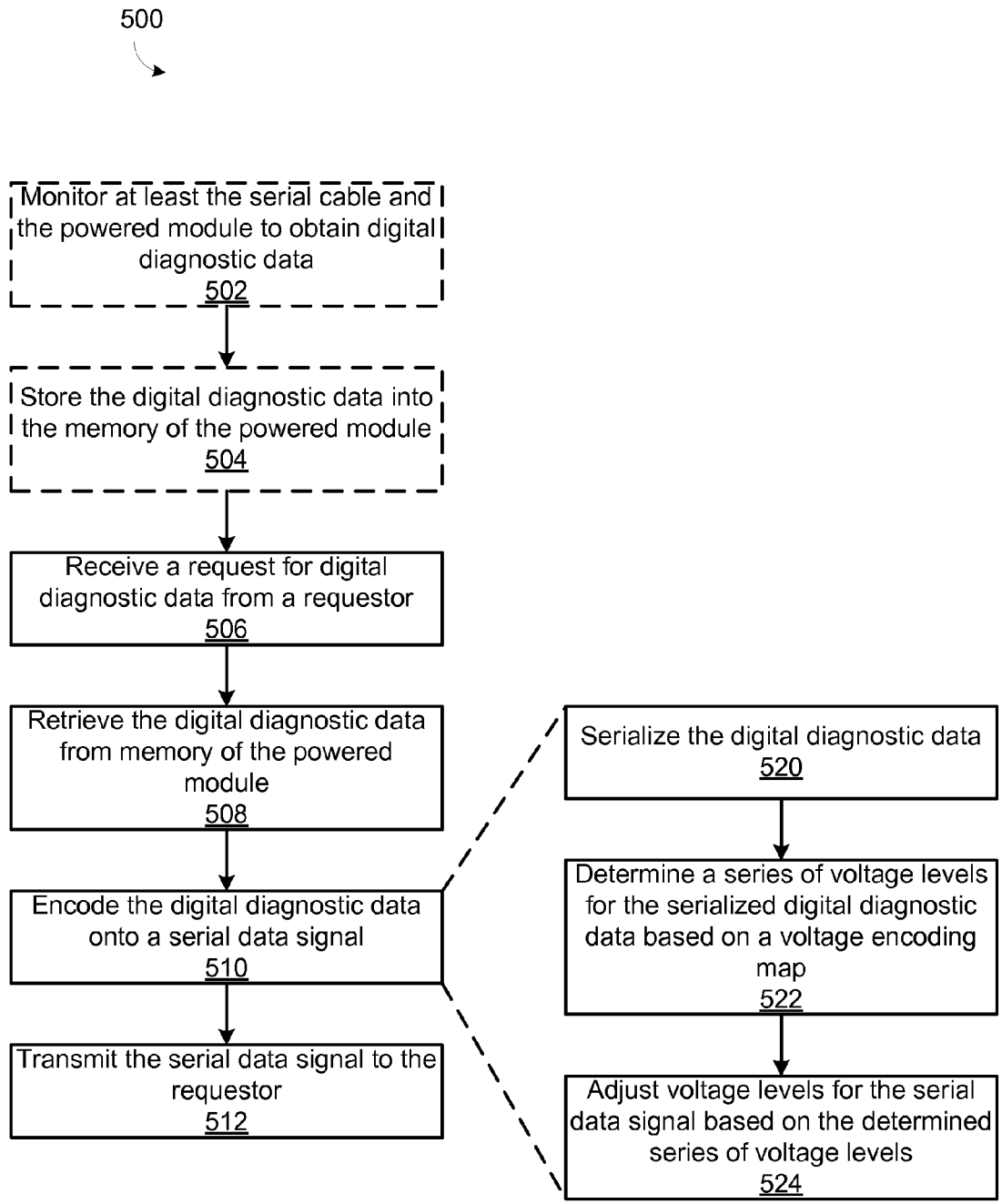
FIG. 5 is a flow diagram of a process for transmitting encoded digital diagnostic data to a host in accordance with some embodiments.

FIG. 5 is a flowchart representing a method 500 for transmitting encoded digital diagnostic data to a host, according to some embodiments. The method 500 may be governed by instructions that are stored in a computer readable storage medium (e.g., the memory 208) and that are executed by one or more processors (e.g., the controller 204). Each of the operations shown in FIG. 6 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

In some embodiments, prior to receiving a request for the digital diagnostic data, at least the serial cable and the powered module are monitored to obtain digital diagnostic data (502) and the obtained digital diagnostic data is stored into the memory of the powered module (504). In some embodiments, the monitoring is performed by one or more of the powered module and an external device (e.g., a host, a diagnostic test device, etc.). In some embodiments, the monitoring is performed periodically.

A powered module receives a request for digital diagnostic data for at least the serial cable and the powered module from a requestor (506). In some embodiments, the requestor includes one or more of a host system and another powered module.

After receiving the request for the digital diagnostic data, the powered module retrieves the digital diagnostic data from memory of the powered module (508). Next, the powered module encodes the digital diagnostic data onto a serial data signal while preserving the original data in the serial data signal (510). In some embodiments, the encoding includes: serializing the digital diagnostic data (520), determining a series of voltage levels for the serialized digital diagnostic data based on a voltage encoding map (522), and adjusting voltage levels for the serial data signal based on the determined series of voltage levels (524).

After encoding the digital diagnostic data onto the serial data signal, the powered module transmits the serial data signal to the requestor (512).

Figure 6:
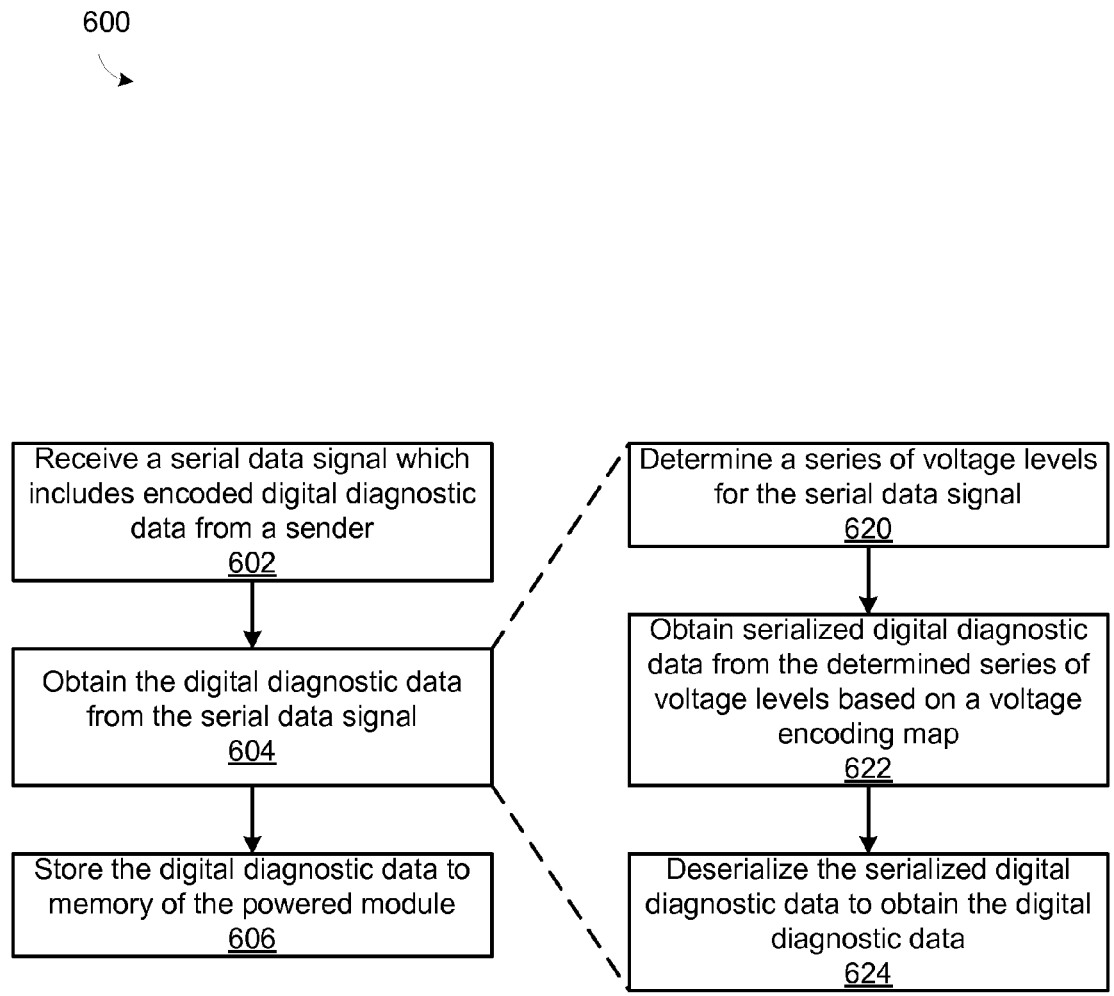
FIG. 6 is a flow diagram of a process for decoding encoded digital diagnostic data in accordance with some embodiments.

FIG. 6 is a flowchart representing a method 600 for decoding encoded digital diagnostic data, according to some embodiments. The method 600 may be governed by instructions that are stored in a computer readable storage medium (e.g., the memory 208) and that are executed by one or more processors (e.g., the controller 204). Each of the operations shown in FIG. 7 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

The one or more processors receive a serial data signal which includes encoded digital diagnostic data from a sender (602). In some embodiments, the sender includes one of a powered module and a host system.

Next, the one or more processors obtain the digital diagnostic data from the serial data signal (604). In some embodiments, the obtaining includes: determining a series of voltage levels for the serial data signal (620), obtaining serialized digital diagnostic data from the determined series of voltage levels based on a voltage encoding map (622), and deserializing the serialized digital diagnostic data to obtain the digital diagnostic data (624).

After obtaining the digital diagnostic data, the one or more processors store the digital diagnostic data to memory (606). In some embodiments, the memory is one of a memory for a powered module and a memory for a host system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

TABLE 1

MEMORY MAP FOR CONTROLLER

| Memory Location (Array 0) | Name of Location | Function |
|---|---|---|
| 00h-5Fh | IEEE Data | This memory block is used to store required GBIC data |
| 60h | Temperature MSB | This byte contains the MSB of the 15-bit 2's complement temperature output from the temperature sensor. |

TABLE 1-continued

MEMORY MAP FOR CONTROLLER

| | | |
|---|---|---|
| 61h | Temperature LSB | This byte contains the LSB of the 15-bit 2's complement temperature output from the temperature sensor. (LSB is 0 b). |
| 62h-63h | $V_{cc}$ Value | These bytes contain the MSB (62h) and the LSB (63h) of the measured $V_{cc}$ (15-bit number, with a 0 b LSbit) |
| 64h-65h | $B_{in}$ Value | These bytes contain the MSB (64h) and the LSB (65h) of the measured $B_{in}$ (15-bit number, with a 0 b LSbit) |
| 66h-67h | $P_{in}$ Value | These bytes contain the MSB (66h) and the LSB (67h) of the measured $P_{in}$ (15-bit number, with a 0 b LSbit) |
| 68h-69h | $R_{in}$ Value | These bytes contain the MSB (68h) and the LSB (69h) of the measured $R_{in}$ (15-bit number, with a 0 b LSbit) |
| 6Ah-6Dh | Reserved | Reserved |
| 6Eh | IO States | This byte shows the logical value of the I/O pins. |
| 6Fh | A/D Updated | Allows the user to verify if an update from the A/D has occurred to the 5 values: temperature, $V_{cc}$, $B_{in}$, $P_{in}$ and $R_{in}$. The user writes the byte to 00h. Once a conversion is complete for a give value, its bit will change to '1'. |
| 70h-73h | Alarm Flags | These bits reflect the state of the alarms as a conversion updates. High alarm bits are '1' if converted value is greater than corresponding high limit. Low alarm bits are '1' if converted value is less than corresponding low limit. Otherwise, bits are 0 b. |
| 74h-77h | Warning Flags | These bits reflect the state of the warnings as a conversion updates. High warning bits are '1' if converted value is greater than corresponding high limit. Low warning bits are '1' if converted value is less than corresponding low limit. Otherwise, bits are 0 b. |
| 78h-7Ah | Reserved | Reserved |
| 7Bh-7Eh | Password Entry Bytes PWE Byte 3 (7Bh) MSByte PWE Byte 2 (7Ch) PWE Byte 1 (7Dh) PWE Byte 0 (7Eh) LSByte | The four bytes are used for password entry. The entered password will determine the user's read/write privileges. |
| 7Fh | Array Select | Writing to this byte determines which of the upper pages of memory is selected for reading and writing. 0xh (Array x Selected) Where x = 1, 2, 3, 4 or 5 |
| 80h-F7h | | Customer EEPROM |
| 87h | DA % Adj | Scale output of D/A converters by specified percentage |

| Memory Location (Array 1) | Name of Location | Function of Location |
|---|---|---|
| 00h-FFh | | Data EEPROM |

| Memory Location (Array 2) | Name of Location | Function of Location |
|---|---|---|
| 00h-Ffh | | Data EEPROM |

| Memory Location (Array 3) | Name of Location | Function of Location |
|---|---|---|
| 80h-81h 88h-89h 90h-91h 98h-99h A0h-A1h | Temperature High Alarm $V_{cc}$ High Alarm $B_{in}$ High Alarm $P_{in}$ High Alarm $R_{in}$ High Alarm | The value written to this location serves as the high alarm limit. Data format is the same as the corresponding value (temperature, $V_{cc}$, $B_{in}$, $P_{in}$, $R_{in}$). |

TABLE 1-continued

MEMORY MAP FOR CONTROLLER

| | | |
|---|---|---|
| 82h-83h | Temperature Low Alarm | The value written to this location serves as the low alarm limit. Data format is the same as the corresponding value (temperature, $V_{cc}$, $B_{in}$, $P_{in}$, $R_{in}$). |
| 8Ah-8Bh | | |
| 92h-93h | $V_{cc}$ Low Alarm | |
| 9Ah-9Bh | $B_{in}$ Low Alarm | |
| A2h-A3h | $P_{in}$ Low Alarm | |
| | $R_{in}$ Low Alarm | |
| 84h-85h | Temp High Warning | The value written to this location serves as the high warning limit. Data format is the same as the corresponding value (temperature, $V_{cc}$, $B_{in}$, $P_{in}$, $R_{in}$). |
| 8Ch-8Dh | $V_{cc}$ High Warning | |
| 94h-95h | $B_{in}$ High Warning | |
| 9Ch-9Dh | $P_{in}$ High Warning | |
| A4h-A5h | $R_{in}$ High Warning | |
| 86h-87h | Temperature Low Warning | The value written to this location serves as the low warning limit. Data format is the same as the corresponding value (temperature, $V_{cc}$, $B_{in}$, $P_{in}$, $R_{in}$). |
| 8Eh-8Fh | | |
| 96h-97h | $V_{cc}$ Low Warning | |
| 9Eh-9Fh | $B_{in}$ Low Warning | |
| A6h-A7h | $P_{in}$ Low Warning | |
| | $R_{in}$ Low Warning | |
| A8h-AFh, C5h | $D_{out}$ control 0-8 | Individual bit locations are defined in Table 4. |
| B0h-B7h, C6h | $F_{out}$ control 0-8 | |
| B8h-BFh, C7h | $L_{out}$ control 0-8 | |
| C0h | Reserved | Reserved |
| C1h | Prescale | Selects MCLK divisor for X-delay CLKS. |
| C2h | $D_{out}$ Delay | Selects number of prescale clocks |
| C3h | $F_{out}$ Delay | |
| C4h | $L_{out}$ Delay | |
| C8h-C9h | $V_{cc}$ - A/D Scale | 16 bits of gain adjustment for corresponding A/D conversion values. |
| CAh-CBh | $B_{in}$ - A/D Scale | |
| CCh-CDh | $P_{in}$ - A/D Scale | |
| CEh-CFh | $R_{in}$ - A/D Scale | |
| D0h | Chip Address | Selects chip address when external pin ASEL is low. |
| D1h | Margin #2 | Finisar Selective Percentage (FSP) for D/A #2 |
| D2h | Margin #1 | Finisar Selective Percentage (FSP) for D/A #1 |
| D3h-D6h | PW1 Byte 3 (D3h) MSB<br>PW1 Byte 2 (D4h)<br>PW1 Byte 1 (D5h)<br>PW1 Byte 0 (D6h) LSB | The four bytes are used for password 1 entry. The entered password will determine the Finisar customer's read/write privileges. |
| D7h | D/A Control | This byte determines if the D/A outputs source or sink current, and it allows for the outputs to be scaled. |
| D8h-DFh | $B_{in}$ Fast Trip | These bytes define the fast trip comparison over temperature. |
| E0h-E3h | $P_{in}$ Fast Trip | These bytes define the fast trip comparison over temperature. |
| E4h-E7h | $R_{in}$ Fast Trip | These bytes define the fast trip comparison over temperature. |
| E8h | Configuration Override Byte | Location of the bits is defined in Table 4 |
| E9h | Reserved | Reserved |
| EAh-EBh | Internal State Bytes | Location of the bits is defined in Table 4 |
| ECh | I/O States 1 | Location of the bits is defined in Table 4 |
| EDh-EEh | D/A Out | Magnitude of the temperature compensated D/A outputs |
| EFh | Temperature Index | Address pointer to the look-up Arrays |
| F0h-FFh | Reserved | Reserved |

| Memory Location (Array 4) | Name of Location | Function of Location |
|---|---|---|
| 00h-Ffh | | D/A Current vs. Temp #1 (User-Defined Look-up Array #1) |

| Memory Location (Array 5) | Name of Location | Function of Location |
|---|---|---|
| 00h-Ffh | | D/A Current vs. Temp #2 (User-Defined Look-up Array #2) |

TABLE 2

DETAIL MEMORY DESCRIPTIONS - A/D VALUES AND STATUS BITS

| Byte | Bit | Name | Description |
|---|---|---|---|
| Converted analog values. Calibrated 16 bit data. (See Notes 1-2) | | | |
| 96 (60h) | All | Temperature MSB | Signed 2's complement integer temperature (−40 to +125 C.) Based on internal temperature measurement |
| 97 | All | Temperature LSB | Fractional part of temperature (count/256) |
| 98 | All | $V_{cc}$ MSB | Internally measured supply voltage in transceiver. Actual voltage is full 16 bit value * 100 uVolt. |
| 99 | All | $V_{cc}$ LSB | (Yields range of 0-6.55 V) |
| 100 | All | TX Bias MSB | Measured TX Bias Current in mA Bias current is full 16 bit value * (1/256) mA. |
| 101 | All | TX Bias LSB | (Full range of 0-256 mA possible with 4 uA resolution) |
| 102 | All | TX Power MSB | Measured TX output power in mW. Output is full 16 bit value * (1/2048) mW. (see note 5) |
| 103 | All | TX Power LSB | (Full range of 0-32 mW possible with 0.5 μW resolution, or −33 to +15 dBm) |
| 104 | All | RX Power MSB | Measured RX input power in mW RX power is full 16 bit value * (1/16384) mW. (see note 6) |
| 105 | All | RX Power LSB | (Full range of 0-4 mW possible with 0.06 μW resolution, or −42 to +6 dBm) |
| 106 | All | Reserved MSB | Reserved for 1$^{st}$ future definition of digitized analog input |
| 107 | All | Reserved LSB | Reserved for 1$^{st}$ future definition of digitized analog input |
| 108 | All | Reserved MSB | Reserved for 2$^{nd}$ future definition of digitized analog input |
| 109 | All | Reserved LSB | Reserved for 2$^{nd}$ future definition of digitized analog input |
| 110 | 7 | TX Disable | Digital state of the TX Disable Input Pin |
| 110 | 6 | Reserved | |
| 110 | 5 | Reserved | |
| 110 | 4 | Rate Select | Digital state of the SFP Rate Select Input Pin |
| 110 | 3 | Reserved | |
| 110 | 2 | TX Fault | Digital state of the TX Fault Output Pin |
| 110 | 1 | LOS | Digital state of the LOS Output Pin |
| 110 | 0 | Power-On-Logic | Indicates transceiver has achieved power up and data valid |
| 111 | 7 | Temp A/D Valid | Indicates A/D value in Bytes 96/97 is valid |
| 111 | 6 | $V_{cc}$ A/D Valid | Indicates A/D value in Bytes 98/99 is valid |
| 111 | 5 | TX Bias A/D Valid | Indicates A/D value in Bytes 100/101 is valid |
| 111 | 4 | TX Power A/D Valid | Indicates A/D value in Bytes 102/103 is valid |
| 111 | 3 | RX Power A/D Valid | Indicates A/D value in Bytes 104/105 is valid |
| 111 | 2 | Reserved | Indicates A/D value in Bytes 106/107 is valid |
| 111 | 1 | Reserved | Indicates A/D value in Bytes 108/109 is valid |
| 111 | 0 | Reserved | Reserved |

TABLE 3

DETAIL MEMORY DESCRIPTIONS - ALARM AND WARNING FLAG BITS
Alarm and Warning Flag Bits

| Byte | Bit | Name | Description |
|---|---|---|---|
| 112 | 7 | Temp High Alarm | Set when internal temperature exceeds high alarm level. |
| 112 | 6 | Temp Low Alarm | Set when internal temperature is below low alarm level. |
| 112 | 5 | $V_{cc}$ High Alarm | Set when internal supply voltage exceeds high alarm level. |
| 112 | 4 | $V_{cc}$ Low Alarm | Set when internal supply voltage is below low alarm level. |

TABLE 3-continued

DETAIL MEMORY DESCRIPTIONS - ALARM AND WARNING FLAG BITS
Alarm and Warning Flag Bits

| Byte | Bit | Name | Description |
|---|---|---|---|
| 112 | 3 | TX Bias High Alarm | Set when TX Bias current exceeds high alarm level. |
| 112 | 2 | TX Bias Low Alarm | Set when TX Bias current is below low alarm level. |
| 112 | 1 | TX Power High Alarm | Set when TX output power exceeds high alarm level. |
| 112 | 0 | TX Power Low Alarm | Set when TX output power is below low alarm level. |
| 113 | 7 | RX Power High Alarm | Set when Received Power exceeds high alarm level. |
| 113 | 6 | RX Power Low Alarm | Set when Received Power is below low alarm level. |
| 113 | 5-0 | Reserved Alarm | |
| 114 | All | Reserved | |
| 115 | All | Reserved | |
| 116 | 7 | Temp High Warning | Set when internal temperature exceeds high warning level. |
| 116 | 6 | Temp Low Warning | Set when internal temperature is below low warning level. |
| 116 | 5 | $V_{cc}$ High Warning | Set when internal supply voltage exceeds high warning level. |
| 116 | 4 | $V_{cc}$ Low Warning | Set when internal supply voltage is below low warning level. |
| 116 | 3 | TX Bias High Warning | Set when TX Bias current exceeds high warning level. |
| 116 | 2 | TX Bias Low Warning | Set when TX Bias current is below low warning level. |
| 116 | 1 | TX Power High Warning | Set when TX output power exceeds high warning level. |
| 116 | 0 | TX Power Low Warning | Set when TX output power is below low warning level. |
| 117 | 7 | RX Power High Warning | Set when Received Power exceeds high warning level. |
| 117 | 6 | RX Power Low Warning | Set when Received Power is below low warning level. |
| 117 | 5 | Reserved Warning | |
| 117 | 4 | Reserved Warning | |
| 117 | 3 | Reserved Warning | |
| 117 | 2 | Reserved Warning | |
| 117 | 1 | Reserved Warning | |
| 117 | 0 | Reserved Warning | |
| 118 | All | Reserved | |
| 119 | All | Reserved | |

TABLE 4

DETAIL MEMORY DESCRIPTIONS - OTHER CONFIGURATION FLAGS

| Byte Name | Bit 7 | Bit 6 | Bit 5 | Bit 4 | Bit 3 | Bit 2 | Bit 1 | Bit 0 |
|---|---|---|---|---|---|---|---|---|
| X-out cntl0 | T alrm hi set | T alrm lo set | V alrm hi set | V alrm lo set | B alrm hi set | B alrm lo set | P alrm hi set | P alrm lo set |
| X-out cntl1 | R alrm hi set | R alrm lo set | B ft hi set | P ft hi set | R ft hi set | D-in inv set | D-in set | F-in inv set |
| X-out cntl2 | F-in set | L-in inv set | L-in set | Aux inv set | Aux set | T alrm hi hib | T alrm lo hib | V alrm hi hib |
| X-out cntl3 | V alrm lo hib | B alrm hi hib | B alrm lo hib | P alrm hi hib | P alrm lo hib | R alrm hi hib | R alrm lo hib | B ft hi hib |
| X-out cntl4 | P ft hi hib | R ft hi hib | D-in inv hib | D-in hib | F-in inv hib | F-in hib | L-in inv hib | L-in hib |
| X-out cntl5 | Aux inv hib | Aux hib | T alrm hi clr | T alrm lo clr | V alrm hi clr | V alrm lo clr | B alrm hi clr | B alrm lo clr |
| X-out cntl6 | P alrm hi clr | P alrm lo clr | R alrm hi clr | R alrm lo clr | B ft hi clr | P ft hi clr | R ft hi clr | D-in invclr |
| X-out cntl7 | D-in clr | F-in inv clr | F-in clr | L-in inv clr | L-in clr | Aux inv clr | Aux clr | EE |
| X-out cntl8 | latch select | invert | o-ride data | o-ride select | S reset data | HI enable | LO enable | Pullup enable |
| Prescale | reserved | reserved | Reserved | reserved | $B^3$ | $B^2$ | $B^1$ | $B^0$ |
| X-out delay | $B^7$ | $B^6$ | $B^5$ | $B^4$ | $B^3$ | $B^2$ | $B^1$ | $B^0$ |
| chip address | $b^7$ | $b^6$ | $b^5$ | $b^4$ | $b^3$ | $b^2$ | $b^1$ | X |
| X-ad scale MSB | $2^{15}$ | $2^{14}$ | $2^{13}$ | $2^{12}$ | $2^{11}$ | $2^{10}$ | $2^9$ | $2^8$ |
| X-ad scale LSB | $2^7$ | $2^6$ | $2^5$ | $2^4$ | $2^3$ | $2^2$ | $2^1$ | $2^0$ |

TABLE 4-continued

DETAIL MEMORY DESCRIPTIONS - OTHER CONFIGURATION FLAGS

| D/A cntl | source/sink | D/A #2 range | | | source/sink | D/A #1 range | | |
|---|---|---|---|---|---|---|---|---|
| | 1/0 | $2^2$ | $2^1$ | $2^0$ | 1/0 | $2^2$ | $2^1$ | $2^0$ |
| config/O-ride | manual D/A | manual index | manual AD alarm | EE Bar | SW-POR | A/D Enable | Manual fast alarm | reserved |
| Internal State 1 | D-set | D-inhibit | D-delay | D-clear | F-set | F-inhibit | F-delay | F-clear |
| Internal State 0 | L-set | L-inhibit | L-delay | L-clear | reserved | reserved | reserved | reserved |
| I/O States 1 | reserved | F-in | L-in | reserved | D-out | reserved | reserved | reserved |
| Margin #1 | Reserved | Neg_Scale2 | Neg_Scale1 | Neg_Scale0 | Reserved | Pos_Scale2 | Pos_Scale1 | Pos_Scale0 |
| Margin #2 | Reserved | Neg_Scale2 | Neg_Scale1 | Neg_Scale0 | Reserved | Pos_Scale2 | Pos_Scale1 | Pos_Scale0 |

What is claimed is:

1. A serial communications device, comprising:
a controller to obtain digital diagnostic data representative of operational characteristics of the serial communications device;
memory to store the digital diagnostic data;
at least one interface, including an interface to serially communicate data via a serial cable; and
a signal controller configured to encode the digital diagnostic data onto a serial data signal for transmission via the serial cable by adjusting signal levels of the serial data signal while preserving original data in the serial data signal, wherein encoding the digital diagnostic data onto the serial data signal while preserving the original data in the serial data signal includes:
serializing the digital diagnostic data;
determining a series of signal levels for the serialized digital diagnostic data based on a signal encoding map; and
adjusting signal levels for the serial data signal based on the determined series of signal levels.

2. The serial communications device of claim 1, wherein the serial communications device supports one or more of:
a Serial Advanced Technology Attachment (SATA) standard; and
a Serial Attached Small Computer System Interface (SAS) standard.

3. The serial communications device of claim 1, wherein the serial cable includes one of:
an optical cable; and
an electrically-conductive cable.

4. The serial communications device of claim 1, wherein the at least one interface includes an interface to receive a request for the digital diagnostic data.

5. The serial communications device of claim 1, wherein the at least one interface enables the serial communications device to communicate with an external host using one or more of:
a Serial Advanced Technology Attachment (SATA) protocol; and
a Serial Attached Small Computer System Interface (SAS) protocol.

6. The serial communications device of claim 1, wherein the at least one interface enables an external host to write the digital diagnostic data to memory of the serial communications device.

7. The serial communications device of claim 1, wherein an external host can read the digital diagnostic data from and/or write the digital diagnostic data to memory of the serial communications device.

8. The serial communications device of claim 1, wherein the digital diagnostic data is stored in memory-mapped locations in memory of the serial communications device.

9. The serial communications device of claim 1, further comprising a signal amplitude sensor configured to decode digital diagnostic data encoded onto a serial data signal by determining signal levels of the serial data signal and obtaining the digital diagnostic data based on the signal encoding map.

10. The serial communications device of claim 1, wherein the at least one interface includes a transmitter configured to transmit serial data signals through the serial cable.

11. The serial communications device of claim 10, wherein:
the serial cable is an electrically-conductive cable; and
the transmitter is configured to transmit electrical signals through the serial cable.

12. The serial communications device of claim 10, wherein:
the serial cable is an optical cable;
the transmitter is to:
convert electrical signals into corresponding optical signals; and
transmit optical signals through the serial cable;
the transmitter is a laser transmitter.

13. The serial communications device of claim 12, wherein the at least one interface includes a laser driver coupled to the laser transmitter, and the laser driver is configured to drive the laser transmitter.

14. The serial communications device of claim 1, wherein the at least one interface includes a receiver configured to receive serial data signals from the serial cable.

15. The serial communications device of claim 14, wherein:
the serial cable is an electrically-conductive cable; and
the receiver is configured to receive electrical signals from the serial cable.

16. The serial communications device of claim 14, wherein:
the serial cable is an optical cable;
the receiver is to:
receive optical signals from the serial cable; and
convert the optical signals into corresponding electrical signals; and
the receiver is a photodiode.

17. The serial communications device of claim 16, wherein the at least one interface includes a post-amplifier coupled to the photodiode, wherein the post-amplifier is configured to generate a fixed output signal.

18. The serial communications device of claim 1, wherein the digital diagnostic data includes one or more of:
a transfer speed for the serial cable;
voltage amplitudes of signals received from the serial cable;
an optical power level of an optical signal received from the serial cable; and
a number of faults.

19. A method, comprising:
at a serial communications device,
  receiving a request for digital diagnostic data for the serial communications device from a requestor; and
  in response to the request:
    encoding the digital diagnostic data onto a serial data signal while preserving the original data in the serial data signal, wherein encoding the digital diagnostic data onto the serial data signal while preserving the original data in the serial data signal includes:
      serializing the digital diagnostic data;
      determining a series of signal levels for the serialized digital diagnostic data based on a signal encoding map; and
      adjusting signal levels for the serial data signal based on the determined series of signal levels; and
    transmitting the serial data signal to the requestor.

20. The method of claim 19, further comprising, prior to receiving the request for the digital diagnostic data:
  monitoring at least the serial communications device to obtain digital diagnostic data; and
  storing the obtained digital diagnostic data into a memory of the serial communications device.

21. The method of claim 20, wherein the monitoring is performed by one or more of:
  the serial communications device; and
  an external device.

22. The method of claim 19, wherein the digital diagnostic data includes one or more of:
  a transfer speed for the serial cable;
  voltage amplitudes of signals received from the serial cable;
  an optical power level of an optical signal received from the serial cable; and
  a number of faults.

* * * * *